US008533505B2

(12) United States Patent
Greenhalgh

(10) Patent No.: US 8,533,505 B2
(45) Date of Patent: Sep. 10, 2013

(54) DATA PROCESSING APPARATUS AND METHOD FOR TRANSFERRING WORKLOAD BETWEEN SOURCE AND DESTINATION PROCESSING CIRCUITRY

(75) Inventor: Peter Richard Greenhalgh, Cambridge (GB)

(73) Assignee: ARM Limited, Cambridge (GB)

( * ) Notice: Subject to any disclaimer, the term of this patent is extended or adjusted under 35 U.S.C. 154(b) by 496 days.

(21) Appl. No.: 12/659,230

(22) Filed: Mar. 1, 2010

(65) Prior Publication Data

US 2011/0213993 A1 Sep. 1, 2011

(51) Int. Cl.
*G06F 1/32* (2006.01)
*G06F 12/00* (2006.01)
*G06F 12/08* (2006.01)

(52) U.S. Cl.
USPC ........... 713/320; 713/300; 713/323; 713/324; 711/141; 711/146

(58) Field of Classification Search
USPC ................. 713/300, 310, 320–324, 330, 340; 700/2; 711/141–146
See application file for complete search history.

(56) References Cited

U.S. PATENT DOCUMENTS

| | | | |
|---|---|---|---|
| 5,913,068 A | 6/1999 | Matoba | |
| 6,263,405 B1 * | 7/2001 | Irie et al. | 711/141 |
| 6,374,362 B1 | 4/2002 | Ohtsu | |
| 6,501,999 B1 | 12/2002 | Cai | |
| 6,631,474 B1 | 10/2003 | Cai et al. | |
| 7,275,124 B2 * | 9/2007 | Ogilvie et al. | 710/310 |
| 7,461,275 B2 * | 12/2008 | Belmont et al. | 713/300 |
| 7,996,663 B2 | 8/2011 | Stillwell et al. | |
| 2002/0095609 A1 | 7/2002 | Tokunaga | |
| 2004/0003309 A1 | 1/2004 | Cai et al. | |
| 2005/0132239 A1 | 6/2005 | Athas et al. | |
| 2005/0166039 A1 | 7/2005 | Wang et al. | |
| 2006/0064606 A1 | 3/2006 | Kim et al. | |
| 2007/0079150 A1 | 4/2007 | Belmont et al. | |
| 2008/0288748 A1 | 11/2008 | Sutardja et al. | |
| 2009/0024799 A1 * | 1/2009 | Jahagirdar et al. | 711/130 |
| 2009/0172369 A1 | 7/2009 | Stillwell et al. | |
| 2010/0287394 A1 * | 11/2010 | Branover et al. | 713/323 |
| 2011/0161586 A1 | 6/2011 | Potkonjak et al. | |
| 2011/0213947 A1 | 9/2011 | Mathieson et al. | |

FOREIGN PATENT DOCUMENTS

| | | |
|---|---|---|
| WO | WO 2004/102376 | 11/2004 |
| WO | WO 2005/062180 | 7/2005 |

OTHER PUBLICATIONS

International Search Report mailed Apr. 27, 2011 in PCT/GB2011/050376.

(Continued)

*Primary Examiner* — Fahmida Rahman
(74) *Attorney, Agent, or Firm* — Nixon & Vanderhye P.C.

(57) ABSTRACT

In response to a transfer stimulus, performance of a processing workload is transferred from a source processing circuitry to a destination processing circuitry, in preparation for the source processing circuitry to be placed in a power saving condition following the transfer. To reduce the number of memory fetches required by the destination processing circuitry following the transfer, a cache of the source processing circuitry is maintained in a powered state for a snooping period. During the snooping period, cache snooping circuitry snoops data values in the source cache and retrieves the snoop data values for the destination processing circuitry.

29 Claims, 14 Drawing Sheets

(56) References Cited

OTHER PUBLICATIONS

International Search Report and Written opinion of the International Searching Authority mailed Jul. 25, 2011 in PCT/GB2011/050319.
International Search Report and Written opinion of the International Searching Authority mailed Jul. 25, 2011 in PCT/GB2011/050315.
International Search Report and Written opinion of the International Searching Authority mailed Jul. 25, 2011 in PCT/GB2011/050317.
U.S. Appl. No. 12/659,235, filed Mar. 1, 2010, Greenhalgh et al.
U.S. Appl. No. 12/659,234, filed Mar. 1, 2010, Greenhalgh et al.
U.S. Appl. No. 12/662,743, filed Apr. 30, 2010, Hill.
Office Action mailed Jun. 4, 2012 in co-pending U.S. Appl. No. 12/659,234.
Kumar et al., "Single-ISA Heterogeneous Multi-Core Architectures: The Potential for Processor Power Reduction", Proceedings of the 36$^{th}$ International Symposium, *IEEE Computer Society*, 2003, 12 pgs.
Kumar et al., "Towards Better Performance Per Watt in Virtual Environments on Asymmetric Single-ISA Multi-core Systems", (No Date), pp. 105-109.
Kumar et al., "Conjoined-core Chip Multiprocessing", Proceedings of the 37$^{th}$ International Symposium, Dec. 2004, pp. 1-12.
Becchi et al., "Dynamic Thread Assignment on Heterogeneous Multiprocessor Architectures", *CF'06*, May 2006, pp. 29-39.
International Preliminary Report on Patentability dated Oct. 5, 2012 in PCT/GB2011/050376.
International Preliminary Report on Patentability mailed Jun. 25, 2012 in PCT/GB2011/050315.
Office Action mailed Dec. 21, 2012 in co-pending U.S. Appl. No. 12/659,235.
Office Action mailed Nov. 23, 2012 in co-pending U.S. Appl. No. 12/662,743.
Office Action mailed Jun. 7, 2013 in co-pending U.S. Appl. No. 12/662,743.

\* cited by examiner

DATA PROCESSING APPARATUS AND METHOD FOR TRANSFERRING WORKLOAD BETWEEN SOURCE AND DESTINATION PROCESSING CIRCUITRY

BACKGROUND OF THE INVENTION

1. Field of the Invention

The present invention relates to a data processing apparatus and method for switching a workload between first and second processing circuitry, and in particular to a technique for improving the processing performance of the workload following the switch.

2. Description of the Prior Art

In modern data processing systems, the difference in performance demand between high intensity tasks such as games operation and low intensity tasks such as MP3 playback can exceed a ratio of 100:1. For a single processor to be used for all tasks, that processor would have to be high performance, but an axiom of processor micro-architecture is that high performance processors are less energy efficient than low performance processors. It is known to improve energy efficiency at the processor level using techniques such as Dynamic Voltage and Frequency Scaling (DVFS) or power gating to provide the processor with a range of performance levels and corresponding energy consumption characteristics. However, such techniques are generally becoming insufficient to allow a single processor to take on tasks with such diverging performance requirements.

Accordingly, consideration has been given to using multi-core architectures to provide an energy efficient system for the performance of such diverse tasks. Whilst systems with multiple processor cores have been used for some time to increase performance by allowing the different cores to operate in parallel on different tasks in order to increase throughput, analysis as to how such systems could be used to improve energy efficiency has been a relatively recent development.

The article "Towards Better Performance Per Watt in Virtual Environments on Asymmetric Single-ISA Multi-Core Systems" by V Kumar et al, ACM SIGOPS Operating Systems Review, Volume 43, Issue 3 (July 2009), discusses Asymmetric Single Instruction Set Architecture (ASISA) multi-core systems, consisting of several cores using the same instruction set architecture (ISA) but differing in features, complexity, power consumption, and performance. In the paper, properties of virtualised workloads are studied to shed insight into how these workloads should be scheduled on ASISA systems in order to improve performance and energy consumption. The paper identifies that certain tasks are more applicable to high frequency/performance micro-architectures (typically computation intensive tasks), while others are more suited to lower frequency/performance micro-architectures and as a side effect will consume less energy (typically input/output intensive tasks). Whilst such studies show how ASISA systems might be used to run diverse tasks in an energy efficient manner, it is still necessary to provide a mechanism for scheduling individual tasks to the most appropriate processors. Such scheduling management will typically place a significant burden on the operating system.

The article "Single-ISA Heterogeneous Multi-Core Architectures: The Potential for Processor Power Reduction" by R Kumar et al, Proceedings of the 36$^{th}$ International Symposium of Microarchitecture (MICRO-36'03) discusses a multi-core architecture where all cores execute the same instruction set, but have different capabilities and performance levels. At run time, system software evaluates the resource requirements of an application and chooses the core that can best meet these requirements while minimising energy consumption. As discussed in section 2 of that paper, during an application's execution the operating system software tries to match the application to the different cores, attempting to meet a defined objective function, for example a particular performance requirement. In section 2.3, it is noted that there is a cost to switching cores, which necessitates restriction of the granularity of switching. A particular example is then discussed where, if the operating system decides a switch is in order, it powers up the new core, triggers a cache flush to save all dirty cache data to a shared memory structure, and then signals the new core to start at a predefined operating system entry point. The old core can then be powered down, whilst the new core retrieves required data from memory. Such an approach is described in section 2.3 as allowing an application to be switched between cores by the operating system. The remainder of the paper then discusses how such switching may be performed dynamically within a multi-core setting with the aim of reducing energy consumption.

Whilst the above paper discusses the potential for single-ISA heterogeneous multi-core architectures to provide energy consumption reductions, it still requires the operating system to be provided with sufficient functionality to enable scheduling decisions for individual applications to be made. The role of the operating system in this respect is made more complex when switching between processor instances with different architectural features. In this regard, it should be noted that the Alpha cores EV4 to EV8 considered in the paper are not fully ISA compatible, as discussed for example in the fifth paragraph of section 2.2.

Further, the paper does not address the problem that there is a significant overhead involved in switching applications between cores, which can significantly reduce the benefits to be achieved from such switching. The overhead includes not just the time taken to perform the switch during which no processor is performing the transferred workload, but also the penalty incurred by cache misses following the switch. When the destination core starts performing the transferred processing, any cache provided in the destination core starts off containing no valid data, and so the destination core experiences cold start cache misses. This means that data has to be fetched from memory, which slows processing performance and uses a significant amount of energy. The performance and energy efficiency recovers only once the destination cache has been "warmed" by caching some of the data values stored in memory. While the above paper by R. Kumar et al recognises the problem of cold-start cache misses at section 4.4, Kumar does not provide any solution to this problem. The present technique seeks to improve processing performance following the switch to the destination processor.

SUMMARY OF THE INVENTION

Viewed from a first aspect, the present invention provides a data processing apparatus comprising:

first processing circuitry and second processing circuitry configured to perform a processing workload such that the processing workload is performed by one of the first processing circuitry and the second processing circuitry at a time;

power control circuitry for independently controlling the power supply to the first processing circuitry and the second processing circuitry;

a workload transfer controller responsive to a transfer stimulus to control a transfer of performance of the processing workload from a source processing circuitry to a destination processing circuitry prior to the source processing circuitry being placed in a power saving condition by the power control circuitry, the source processing circuitry being one of the first and second processing circuitry and the destination processing circuitry being the other of the first and second processing circuitry; wherein:

at least the source processing circuitry has a cache;

the power control circuitry is configured to maintain at least the cache of the source processing circuitry in a powered condition during a snooping period following the start of performance of the transferred processing workload by the destination processing circuitry;

the data processing apparatus comprises cache snooping circuitry configured during the snooping period to snoop data values in the cache of the source processing circuitry and to retrieve the snooped data values for the destination processing circuitry; and the power control circuitry is configured to place said at least the cache of the source processing circuitry in the power saving condition following the end of the snooping period.

The data processing apparatus of the present invention has first and second processing circuitry, and at any time during processing, one of the first and second processing circuitry is performing a processing workload. When a transfer stimulus occurs, performance of the processing workload is transferred from a source processing circuitry (whichever of the first and second processing circuitry is currently performing the workload at the time of receipt of the transfer stimulus) to a destination processing circuitry (the other of the first and second processing circuitry), in preparation for the source processing circuitry to be placed in a power saving condition. Irrespective of how the transfer itself is achieved, the present technique improves the performance level of the destination circuitry after the processing workload has been transferred to the destination circuitry.

The present technique recognises that following the transfer, the destination processing circuitry may require data values that were stored in a cache of the source processing circuitry before the transfer. At least the cache of the source processing circuitry is maintained in a powered condition for a finite period (the snooping period) following the start of performance of the transferred processing workload by the destination processing circuitry. Cache snooping circuitry snoops the data in the source cache during the snooping period, and retrieves data on behalf of the destination processing circuitry. By maintaining power to the source cache during the snooping period, the destination processing circuitry has access to the data in the source cache for an initial period of processing, thus avoiding the need to fetch the data from memory. Since accesses to the source cache are quicker and use less power than accesses to memory, the present technique improves the performance level of the destination processing circuitry, and the energy efficiency of the apparatus as a whole, following the transfer of the processing workload.

The present technique also recognises that the snooping of data in this source cache is only useful for a finite period following the start of performance of the processing workload by the destination processing circuitry. Eventually, the data in the source cache is no longer relevant to the processing performed by the destination processing circuitry. For example, the destination processing circuitry may begin processing another application that does not require the data from the source cache, or the destination processing circuitry may have processed the data such that an updated value, different to the value stored in the source cache, is now being used. Therefore, at the end of the snooping period, the cache snooping circuitry stops snooping data values from the source cache, and the power control circuitry is configured to place at least the cache of the source processing circuitry in the power saving condition, so as to save energy.

In summary, instead of powering down the source cache immediately following the transfer of the processing workload to the destination processing circuitry, the source cache is maintained in a powered state for a snooping period during which the cache snooping circuitry can snoop data values in the source cache and retrieve the snoop data values for the destination processing circuitry. By reducing the number of times data is fetched from a memory, the performance level and energy efficiency is improved.

While the present application will generally describe the present technique for the case where there are two processing circuits (the first and second processing circuitry), the data processing apparatus may comprise further processing circuits and the technique may be applied to the transfer of a processing workload between any two of the processing circuits. Moreover, each processing circuitry may include a single processor core, or a plurality of processor cores.

The processing workload may include at least one processing application and at least one operating system for running the at least one processing application. By treating the entire workload as a macroscopic entity that is performed on only one of the first and second processing circuits at any particular point in time, the workload can be readily switched between the first and second processing circuits in a manner transparent to the operating system. Such an approach addresses the earlier mentioned problems that result from using the operating system to manage scheduling of applications to particular processing circuits.

The workload transfer controller may be configured during the transfer to mask predetermined processor specific configuration information from the at least one operating system such that the transfer of the workload is transparent to the at least one operating system. This means that the configuration of the operating system is simplified because the operating system does not need to be aware of the differences between the processor specific configuration information associated with the first processing circuitry and the processor specific configuration information associated with the second processing circuitry. Since processor-specific differences of the first and second processing circuitry are masked from the operating system, then from the operating system's perspective (and the perspective of any applications run by the operating system), the workload is being run on a single hardware platform. Whether the workload is being run on the first processing circuitry or the second processing circuitry, the operating system's view of the hardware platform is the same. This makes it easier to configure the operating system and applications.

The workload transfer controller may comprise at least virtualisation software logically separating the at least one operating system from the first processing circuitry and the second processing circuitry. The virtualisation software provides a level of abstraction in order to hide the hardware configuration of the respective processing circuitries from the operating system, so that the operating system is unaware which processing circuitry is performing the workload. Thus, the operating system configuration can be simplified. The virtualisation software may control the allocation of the processing workload to either the first processing circuitry or the second processing circuitry.

The first processing circuitry may be architecturally compatible with the second processing circuitry such that a processing workload to be performed by the data processing apparatus can be performed on either the first processing circuitry or the second processing circuitry. This means that from an application perspective, the only difference between the application running on the first processing circuitry and the application running on the second processing circuitry is the performance level or energy efficiency achieved. There is no need for an instruction set conversion between the first and second processing circuitry. The entire processing workload including the operating system and the applications being run by the operating system can be transferred backwards and forwards between the first and second processing circuitry in a simple way.

The first processing circuitry may be micro-architecturally different to the second processing circuitry such that performance of the first processing circuitry is different from performance of the second processing circuitry. The one of the first and second processing circuitry having the higher performance level will generally consume more energy than the other one of the first and second processing circuitry. This means that the workload can be switched to the higher performance processing circuitry if high performance processing is required (for example, when a gaming application is being performed). On the other hand, if low performance processing, such as MP3 playback, is being performed then the processing workload can be switched in its entirety to the lower performance processing circuitry in order to improve energy efficiency. Thus, by providing micro-architecturally different processing circuits the performance of the processing workload can be optimised for performance or energy consumption depending on the nature of the workload to be performed.

The micro-architectural differences between the processing circuitries can include, for example, different execution pipeline lengths or different execution resources. Differences in pipeline length will typically result in differences in operating frequency, which in turn will have an effect on performance. Similarly, differences in execution resources will have an effect on processing throughput and hence performance. For example, a processing circuit having wider execution resources will enable more information to be processed at any particular point in time, improving throughput. In addition, or alternatively, one processing circuit may have more execution resources than the other, for example, more arithmetic logic units (ALUs), which again will improve throughput. As another example of different execution resources, an energy efficient processing circuit may be provided with a simple in-order pipeline, whilst a higher performance processing circuit may be provided with an out-of-order superscalar pipeline. Also, a higher performance processing circuit could have branch prediction capability which speeds up processing by prefetching predicted branch targets before the branch has been resolved, while a more energy efficient processing circuit could have no branch predictor. Such micro-architectural differences do not affect the ability of each architecturally compatible processing circuit to perform the same processing workload, but result in different levels of performance and energy consumption when the respective processing circuits are performing the processing workload.

The present technique may be used when only the source processing circuitry has a cache. In this case, some memory accesses can be avoided by the destination processing circuitry using the cache snooping circuitry to snoop the source cache during the snooping period. Following the end of the snooping period, all data would need to be fetched from memory.

However, typically the destination processing circuitry would also comprise a cache, such that both the first and second processing circuitry comprises a cache. In this case, the data values snooped by the cache snooping circuitry and retrieved for the destination processing circuitry by the cache snooping circuitry can be stored in the cache of the destination processing circuitry to speed up future references to the data.

In an embodiment, the power control circuitry may be configured to place the source processing circuitry, other than the cache, in the power saving condition during the snooping period, and to place the cache of the source processing circuitry in the power saving condition following the end of the snooping period. This reduces the power consumption of the data processing apparatus, since most of the source processing circuitry can be powered down after the workload has been handed over to the destination processor. Only the cache of source processing circuitry remains powered during the snooping period, to enable the cache snooping circuitry to retrieve the values stored in the source cache for the destination processing circuitry.

In one embodiment, when the cache is part of a cache hierarchy in the source processing circuitry, the snooped source cache can be maintained in the powered condition during the snooping period while at least one other cache in the cache hierarchy is in the power saving condition.

An example of this situation is when the source cache to be snooped is a level two inclusive cache which is configured to store all of the data stored in any level one cache(s) of the cache hierarchy. In this case, the level two cache can be left in a powered state during the snooping period to enable snooping from the cache snooping circuitry on behalf of the destination processing circuitry, while the level one cache(s) can be powered down along with the rest of the source processing circuitry.

Alternatively, the power control circuitry may be configured to maintain the source processing circuitry in the powered condition during the snooping period and to place the entire source processing circuitry, including the cache, in the power saving condition following the end of the snooping period. Although leaving the source processing circuitry powered during the snooping period increases power consumption, it reduces the complexity of the data processing apparatus since independent power control to both the source cache and the remainder of the source processing circuitry is not required.

An example situation in which it may be desired to power the source cache and source processing circuitry together is when the cache of the source processing circuitry to be snooped by the cache snooping circuitry is a level one cache. A level one cache may be too closely integrated to a processor core within the source processing circuitry to be able to provide separate power control to the cache and the rest of the source processing circuitry. In this case, the entire source processing circuitry including the cache can be left powered during the snooping period and powered down following the end of the snooping period.

The source processing circuitry may be configured to perform a cleaning operation on the source cache to write back any dirty data from the cache to a shared memory following the end of the snooping period and before the power control circuitry places the cache of the source processing circuitry in the power saving condition. By cleaning the source cache before the cache is powered down, it is ensured that any dirty data, whose latest value has not yet been written back to memory, is not lost.

To save energy, it can be useful for the power control circuitry to maintain the destination processing circuitry in the power saving condition before the occurrence of the transfer stimulus. In this case, the power control circuitry can power up the destination processing circuitry in response to the transfer stimulus.

The destination processing circuitry may be configured to invalidate the destination cache before the destination processing circuitry starts performing the transferred processing workload. For example, if the destination processing circuitry has been in the power saving condition prior to the transfer of the performance of the processing workload, then on powering up the destination processing circuitry the destination cache can contain erroneous data. By invalidating the destination cache before the destination processing circuitry starts performing the transferred processing workload, processing errors can be avoided.

To improve processing performance, the source processing circuitry may be configured to continue performing the processing workload while the cache of the destination processing circuitry is being invalidated, and the workload transfer controller may be configured to transfer the performance of the processing workload to the destination processing circuitry after the cache of the destination processing circuitry has been invalidated. By allowing the source processing circuitry to continue performing the processing workload until the destination processing circuitry is ready to start performing the processing workload, the period of time during which neither processing circuitry is performing the processing workload is reduced and so the performance level of the processing workload is increased.

In one embodiment, the snooping period may begin when the destination processing circuitry starts performing the processing workload.

The snooping period may end on the occurrence of any one of a set of snoop stop events comprising at least one snoop stop event. One or more snoop stop events, indicating that it is no longer worth keeping the source cache in the powered state, can trigger the cache snooping circuitry to end the snooping period. Typically, these events indicate that the data in the source cache is no longer needed by the destination processing circuitry.

The cache snooping circuitry may be configured to monitor whether any of the set of snoop stop events have occurred. For example, the cache snooping circuitry may comprise performance counters for monitoring the processing of the destination processing circuitry and the data accesses performed by the destination processing circuitry. Using the performance counters, the cache snooping circuitry can analyse whether the data in the source cache is still relevant to the processing being performed by the destination processing circuitry. By configuring the cache snooping circuitry, rather than the destination processing circuitry, to monitor whether any of the snoop stop events has occurred, the destination processing circuitry can be left unaware of whether the source cache is still being snooped. This makes the configuration of the destination processing circuitry simpler.

The at least one snoop stop event may include an event that occurs that when the percentage of snoops performed by the cache snooping circuitry that result in a cache hit in the cache of the source processing circuitry drops below a predetermined threshold level. If the percentage of cache hits in the source cache becomes low, then this indicates that many of the data values sought by the destination processing circuitry are no longer present in the source cache, and so the data in the source cache is not relevant to the destination processing circuitry. Therefore, power efficiency can be improved by ending the snooping period and shutting down the source cache once the percentage of cache hits drops below a predetermined threshold level.

The at least one snoop stop event may also include an event that occurs when the destination processing circuitry completes a predetermined number of processing transactions of a predetermined type following the transfer of the processing workload. Although the destination processing circuitry can access the data stored in the source cache via the cache snooping circuitry, the destination processing circuitry will not typically be able to update the values in the source cache. It can be expected that, after a predetermined number of transactions have completed, the destination processing circuitry will have generated new values for some of the data originally stored in the source cache. Since the destination processing circuitry cannot write data to the source cache, the new data values would be stored in memory and/or a destination cache, which means that the original data values in the source cache are no longer relevant to the destination processing circuitry. Therefore, the completion of the predetermined number of processing transactions of the predetermined type can indicate that the source cache is no longer needed and so can trigger the end of the snooping period. The predetermined type of processing transactions could comprise, for example, all transactions performed by the destination processing circuitry or could comprise only cacheable transactions.

Another type of snoop stop event can be an event that occurs when a predetermined number of processing cycles have elapsed after the destination processing circuitry starts performing the transferred processing workload. As mentioned above, the destination processing will not typically be able to update the values in the source cache. Therefore, after the destination processing circuitry has performed processing for a certain number of processing cycles, the data used by the data processing circuitry (e.g. data stored in memory or a destination cache) is unlikely to be the same as the data still stored in the source cache. This means that the number of processing cycles that have elapsed since the start of the performance of the processing workload by the destination processing circuitry can be an indicator that the source cache is no longer useful to the destination processing circuitry and can be powered down.

Where the apparatus comprises a shared memory shared between the first and second processing circuitry, the at least one snoop stop event may include an event that occurs when a particular memory region of the shared memory is accessed for the first time by the destination processing circuitry after starting performance of the transferred processing workload. The first access to a particular memory region can indicate, for example, that the destination processing circuitry has started a new application associated with the particular memory region, different to the application previously being processed by the destination processing circuitry. This can indicate that the data in the source cache, which is not associated with the new application, is no longer relevant to the destination processing circuitry. Therefore, the first access to the particular memory region can trigger the end of the snooping period.

For similar reasons, the snoop stop event can also include an event that occurs when a particular memory region of the shared memory, which was accessed by the destination circuitry for an initial period after starting performance of the transferred processing workload, is not accessed by the destination processing circuitry for a predetermined period. When the destination processing circuitry starts processing a different application to the one originally processed by the source processing circuitry, then a memory region associated with the original application may not be accessed for a period of time. This can indicate that the data in the source cache is no longer being used by the destination processing circuitry and so can trigger the end of the snooping period.

Another type of snoop stop event is an event that occurs when the destination processing circuitry writes to a predetermined memory location of the shared memory for the first time after starting performance of the transferred processing workload. This allows the destination processing circuitry to signal to the cache snooping circuitry that it no longer needs the data in the source cache by writing to the predetermined memory location.

The set of snoop stop events can include any one or a plurality of the above mentioned snoop stop events, as well as other types of snoop stop event.

As used herein, the term "shared memory" refers to memory which can be directly accessed by both the first processing circuitry and the second processing circuitry, for example main memory coupled to both the first and second processing circuitry via an interconnect.

The apparatus may comprise a snoop override controller responsive to a snoop override condition to override snooping of the cache of the source processing circuitry by the cache snooping circuitry and to control the power control circuitry to place the source processing circuitry, including the cache, in the power saving state after the transfer of the performance of the processing workload without waiting for the end of the snooping period. In certain situations, snooping of the source cache may not be useful for the destination processing circuitry. In such situations, the snoop override controller can override the cache snooping circuitry by preventing snooping of the source cache and controlling the power control circuitry to place the source processing circuitry, including the cache, in the power saving state without waiting for the end of the snooping period. The snoop override controller may be provided, for example, as firmware executed on the source processing circuitry or as part of virtualising software which masks the hardware specific information of the processing circuitry from the operating system.

For example, it may be known before the transfer of the performance of the processing workload that the data in the source cache will not be required for the processing about to be performed by the destination processing circuitry following the transfer. For example, if the source processing circuitry has just finished performing a game application, then the data used by the game application may not be useful for the destination processing circuitry after it begins processing a different application. In this case, the snoop override controller can signal to the cache snooping circuitry and power control circuitry that the snooping of the cache is not necessary.

The cache snooping circuitry may comprise a coherent interconnect coupled to the first and second processing circuitry. The coherent interconnect has a view of both the source cache and any shared memory present in the data processing apparatus. The destination processing circuitry can simply request data from the coherent interconnect, and the coherent interconnect can manage whether data is snooped from the source cache or fetched for memory (depending on whether or not the snooping period has completed yet and whether or not the data access request results in a hit in the source cache). The coherent interconnect manages the data accesses so that the destination processing circuitry does not need to be aware of the exact location of the requested data. The destination processing circuitry can be unaware of the snooping of data from the source cache. The coherent interconnect can in some embodiments also provide a convenient mechanism for transferring architectural state data from the source processing circuitry to the destination processing circuitry during the handover of the processing workload.

Viewed from another aspect, the present invention provides a data processing apparatus comprising:

first processing means for performing processing and second processing means for performing processing, the first processing means and second processing means being configured to perform a processing workload such that the processing workload is performed by one of the first processing means and the second processing means at a time;

power control means for independently controlling the power supply to the first processing means and the second processing means;

workload transfer control means for, in response to a transfer stimulus, controlling a transfer of performance of the processing workload from a source processing means to a destination processing means prior to the source processing means being placed in a power saving condition by the power control means, the source processing means being one of the first and second processing means and the destination processing means being the other of the first and second processing means; wherein:

at least the source processing means has a cache means for storing cached data values;

the power control means is configured to maintain at least the cache means of the source processing means in a powered condition during a snooping period following the start of performance of the transferred processing workload by the destination processing means;

the data processing apparatus comprises cache snooping means for snooping data values in the cache means of the source processing means during the snooping period, and retrieving the snooped data values for the destination processing means; and the power control means is configured to place said at least the cache means of the source processing means in the power saving condition following the end of the snooping period.

Viewed from yet another aspect, the present invention provides a data processing method for an apparatus comprising first processing circuitry and second processing circuitry configured to perform a processing workload such that the processing workload is performed by one of the first processing circuitry and the second processing circuitry at a time; the method comprising:

performing the processing workload with a source processing circuitry, the source processing circuitry being one of the first and second processing circuitry and comprising a cache, the other of the first and second processing circuitry being a destination processing circuitry;

in response to a transfer stimulus, transferring performance of the processing workload from the source processing circuitry to the destination processing circuitry prior to the source processing circuitry being placed in a power saving condition;

maintaining at least the cache of the source processing circuitry in a powered condition during a snooping period following the start of performance of the transferred processing workload by the destination processing circuitry;

during the snooping period, snooping data values in the cache of the source processing circuitry and retrieving the snooped data values for the destination processing circuitry; and placing said at least the cache of the source processing circuitry in the power saving condition following the end of the snooping period.

Viewed from a further aspect the present invention provides a data processing apparatus comprising:

first processing circuitry and second processing circuitry configured to perform a processing workload such that the processing workload is performed by one of the first processing circuitry and the second processing circuitry at a time;

a workload transfer controller responsive to a transfer stimulus to control a transfer of performance of the processing workload from a source processing circuitry to a destination processing circuitry prior to the source processing circuitry being placed in a power saving condition by the power control circuitry, the source processing circuitry being one of the first and second processing circuitry and the destination processing circuitry being the other of the first and second processing circuitry; wherein:

at least the destination processing circuitry has a cache;

the destination processing circuitry is configured to invalidate the cache of the destination processing circuitry before the destination processing circuitry starts performing the transferred processing workload;

the source processing circuitry is configured to continue performing the processing workload while the cache of the destination processing circuitry is being invalidated; and the workload transfer controller is configured to transfer the performance of the processing workload to the destination processing circuitry after the cache of the destination processing circuitry has been invalidated.

The present technique can improve the processing performance by allowing the source processing circuitry to continue processing the processing workload for a period following the receipt of the transfer stimulus while the cache of a destination processing circuitry is being invalidated. By only transferring performance of the processing workload to the destination processing circuitry after the cache of the destination processing circuitry has been invalidated, the time during which neither processing circuitry is performing the workload can be reduced. Therefore, the processing workload is performed faster and more efficiently.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
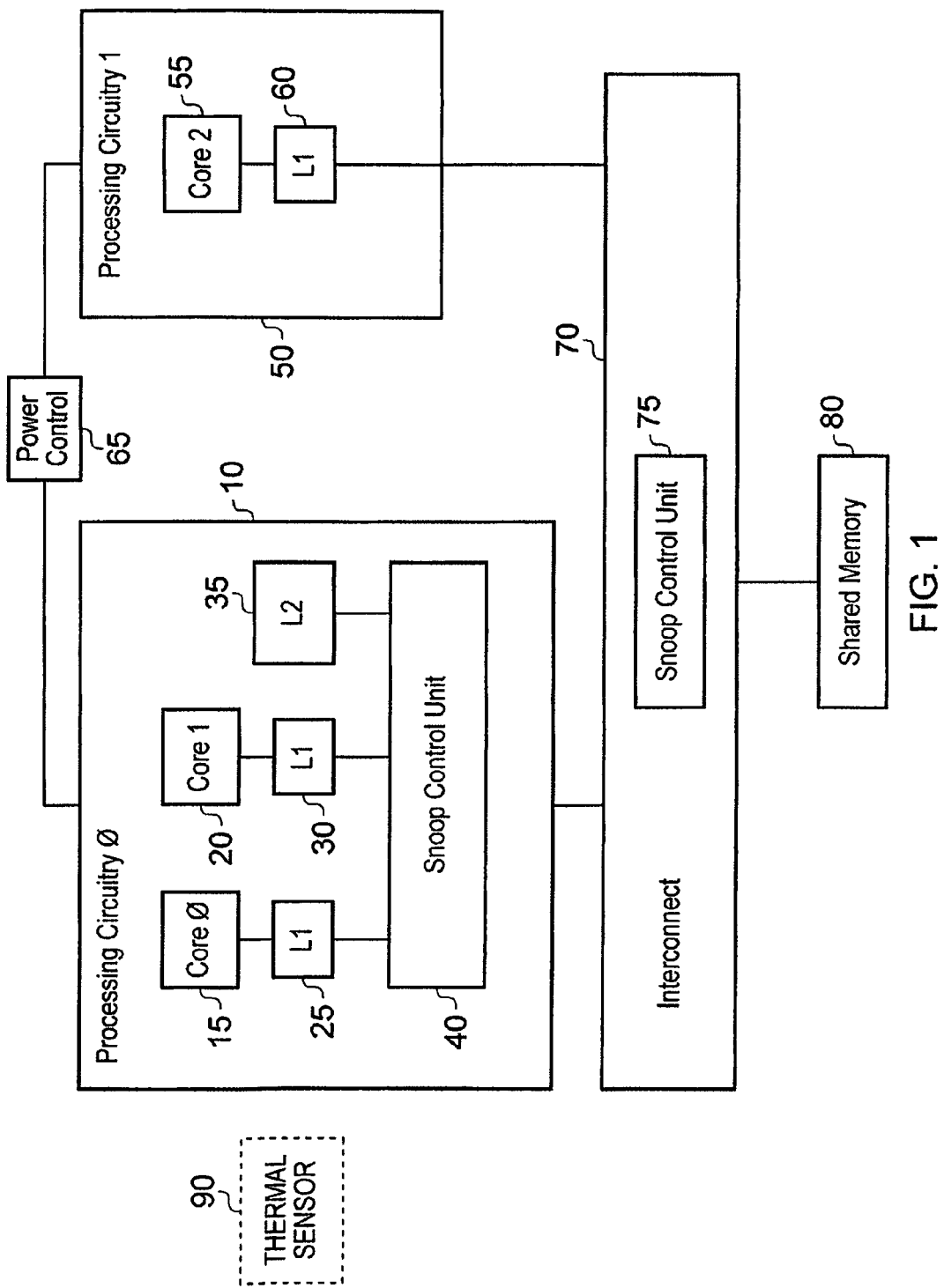
FIG. 1 is a block diagram of a data processing system in accordance with one embodiment.

FIG. 1 is a block diagram schematically illustrating a data processing system in accordance with one embodiment. As shown in FIG. 1, the system contains two architecturally compatible processing circuit instances (the processing circuitry 0 10 and the processing circuitry 1 50), but with those different processing circuit instances having different micro-architectures. In particular, the processing circuitry 10 is arranged to operate with higher performance than the processing circuitry 50, but with the trade-off that the processing circuitry 10 will be less energy efficient than the processing circuitry 50. Examples of micro-architectural differences will be described in more detail below with reference to FIGS. 8A and 8B.

Each processing circuit may include a single processing unit (also referred to herein as a processor core), or alternatively at least one of the processing circuit instances may itself comprise a cluster of processing units with the same micro-architecture.

In the example illustrated in FIG. 1, the processing circuit 10 includes two processor cores 15, 20 which are both architecturally and micro-architecturally identical. In contrast, the processing circuit 50 contains only a single processor core 55. In the following description, the processor cores 15, 20 will be referred to as "big" cores, whilst the processor core 55 will be referred to as a "little" core, since the processor cores 15, 20 will typically be more complex than the processor core 55 due to those cores being designed with performance in mind, whereas in contrast the processor core 55 is typically significantly less complex due to being designed with energy efficiency in mind.

In FIG. 1, each of the cores 15, 20, 55 is assumed to have its own associated local level 1 cache 25, 30, 60, respectively, which may be arranged as a unified cache for storing both instructions and data for reference by the associated core, or can be arranged with a Harvard architecture, providing distinct level 1 data and level 1 instruction caches. Whilst each of the cores is shown as having its own associated level 1 cache, this is not a requirement, and in alternative embodiments, one or more of the cores may have no local cache.

In the embodiment shown in FIG. 1, the processing circuitry 10 also includes a level 2 cache 35 shared between the core 15 and the core 20, with a snoop control unit 40 being used to ensure cache coherency between the two level 1 caches 25, 30 and the level 2 cache 35. In one embodiment, the level 2 cache is arranged as an inclusive cache, and hence any data stored in either of the level 1 caches 25, 30 will also reside in the level 2 cache 35. As will be well understood by those skilled in the art, the purpose of the snoop control unit 40 is to ensure cache coherency between the various caches, so that it can be ensured that either core 15, 20 will always access the most up-to-date version of any data when it issues an access request. Hence, purely by way of example, if the core 15 issues an access request for data that does not reside in the associated level 1 cache 25, then the snoop control unit 40 intercepts the request as propagated on from the level 1 cache 25, and determines with reference to the level 1 cache 30 and/or the level 2 cache 35 whether that access request can be serviced from the contents of one of those other caches. Only if the data is not present in any of the caches is the access request then propagated on via the interconnect 70 to main memory 80, the main memory 80 being memory that is shared between both the processing circuitry 10 and the processing circuitry 50.

The snoop control unit 75 provided within the interconnect 70 operates in a similar manner to the snoop control unit 40, but in this instance seeks to maintain coherency between the cache structure provided within the processing circuitry 10 and the cache structure provided within the processing circuitry 50. In examples where the level 2 cache 35 is an inclusive cache, then the snoop control unit maintains hardware cache coherency between the level 2 cache 35 of the processing circuitry 10 and the level 1 cache 60 of the processing circuitry 50. However, if the level 2 cache 35 is arranged as an exclusive level 2 cache, then the snoop control unit 75 will also snoop the data held in the level 1 caches 25, 30 in order to ensure cache coherency between the caches of the processing circuitry 10 and the cache 60 of the processing circuitry 50.

In accordance with one embodiment, only one of the processing circuitry 10 and the processing circuitry 50 will be actively processing a workload at any point in time. For the purposes of the present application, the workload can be considered to comprise at least one application and at least one operating system for running that at least one application, such as illustrated schematically by the reference numeral 100 in FIG. 2. In this example, two applications 105, 110 are running under control of the operating system 115, and collectively the applications 105, 110 and the operating system 115 form the workload 100. The applications can be considered to exist at a user level, whilst the operating system exists at a privileged level, and collectively the workload formed by the applications and the operating system runs on a hardware platform 125 (representing the hardware level view). At any point in time that hardware platform will either be provided by the processing circuitry 10 or by the processing circuitry 50.

As shown in FIG. 1, power control circuitry 65 is provided for selectively and independently providing power to the processing circuitry 10 and the processing circuitry 50. Prior to a transfer of the workload from one processing circuit to the other, only one of the processing circuits will typically be fully powered, i.e. the processing circuit currently performing the workload (the source processing circuitry), and the other processing circuit (the destination processing circuitry) will typically be in a power saving condition. When it is determined that the workload should be transferred from one processing circuit to the other, there will then be a period of time during the transfer operation where both processing circuits are in the powered on state, but at some point following the transfer operation, the source processing circuit from which the workload has been transferred will then be placed into the power saving condition.

The power saving condition can take a variety of forms, dependent on implementation, and hence for example may be one of a powered off condition, a partial/full data retention condition, a dormant condition or an idle condition. Such conditions will be well understood by a person skilled in the art, and accordingly will not be discussed in more detail herein.

The aim of the described embodiments is to perform switching of the workload between the processing circuits depending on the required performance/energy level of the workload. Accordingly, when the workload involves the execution of one or more performance intensive tasks, such as execution of games applications, then the workload can be executed on the high performance processing circuit 10, either using one or both of the big cores 15, 20. However, in contrast, when the workload is only performing low performance intensity tasks, such as MP3 playback, then the entire workload can be transferred to the processing circuit 50, so as benefit from the energy efficiencies that can be realised from utilising the processing circuit 50.

To make best use of such switching capabilities, it is necessary to provide a mechanism that allows the switching to take place in a simple and efficient manner, so that the action of transferring the workload does not consume energy to an extent that will negate the benefits of switching, and also to ensure that the switching process is quick enough that it does not in itself degrade performance to any significant extent.

In one embodiment, such benefits are at least in part achieved by arranging the processing circuitry 10 to be architecturally compatible with the processing circuitry 50. This ensures that the workload can be migrated from one processing circuitry to the other whilst ensuring correct operation. As a bare minimum, such architectural compatibility requires both processing circuits 10 and 50 to share the same instruction set architecture. However, in one embodiment, such architectural compatibility also entails a higher compatibility requirement so as to ensure that the two processing circuit instances are seen as identical from a programmer's view. In one embodiment, this involves use of the same architectural registers, and one or more special purpose registers storing data used by the operating system when executing applications. With such a level of architectural compatibility, it is then possible to mask from the operating system 115 the transfer of the workload between processing circuits, so that the operating system is entirely unaware as to whether the workload is being executed on the processing circuitry 10 or on the processing circuitry 50.

Figure 2:
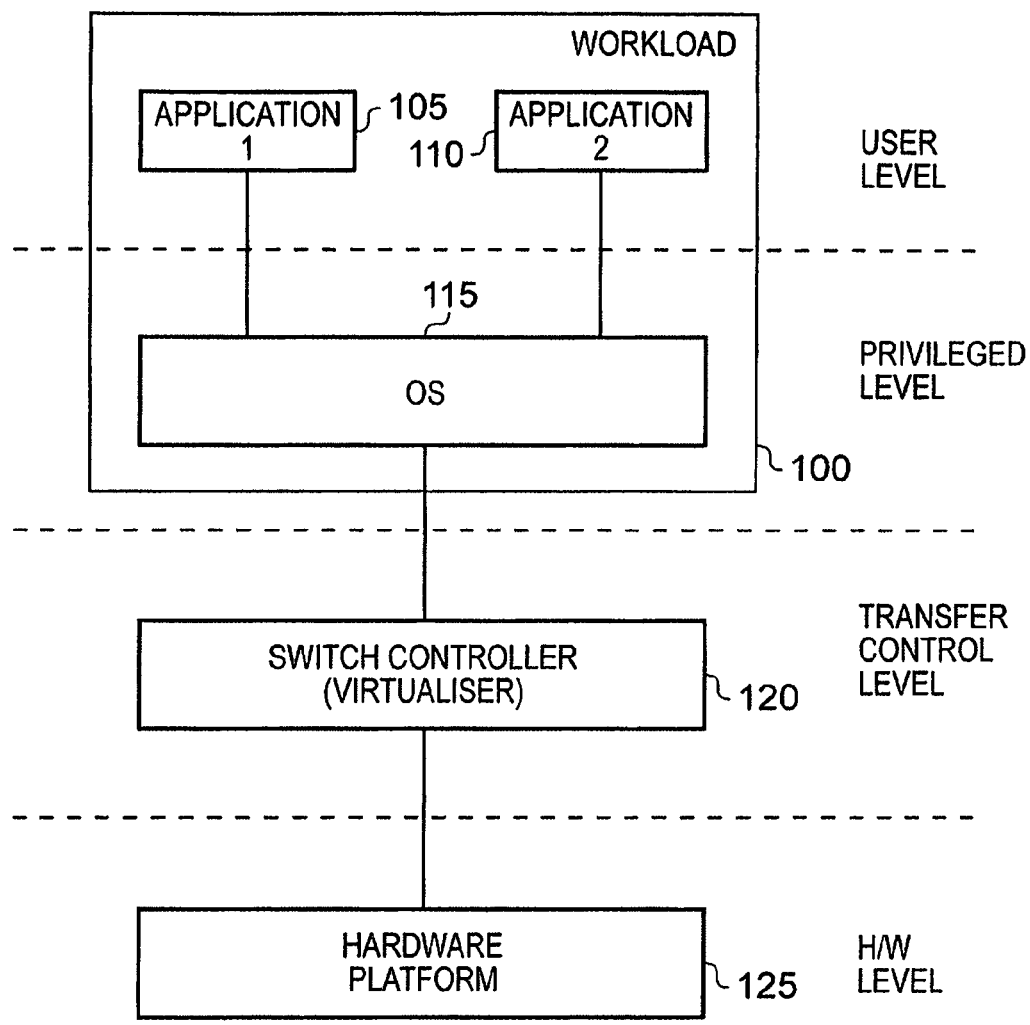
FIG. 2 schematically illustrates the provision of a switch controller (also referred to herein as a workload transfer controller) in accordance with one embodiment to logically separate the workload being performed by the data processing apparatus from the particular hardware platform within the data processing apparatus being used to perform that workload.

In one embodiment, the handling of the transfer from one processing circuit to the other is managed by the switch controller 120 shown in FIG. 2 (also referred to therein as a virtualiser and elsewhere herein as a workload transfer controller). The switch controller can be embodied by a mixture of hardware, firmware and/or software features, but in one embodiment includes software similar in nature to hypervisor software found in virtual machines to enable applications written in one native instruction set to be executed on a hardware platform adopting a different native instruction set. Due to the architectural compatibility between the two processing circuits 10, 50, the switch controller 120 can mask the transfer from the operating system 115 merely by masking one or more items of predetermined processor specific configuration information from the operating system. For example, the processor specific configuration information may include the contents of a CP15 processor ID register and CP15 cache type register.

In such an embodiment, the switch controller then merely needs to ensure that any current architectural state held by the source processing circuit at the time of the transfer, and that is not at the time the transfer is initiated already available from shared memory 80, is made available to the destination processing circuit in order to enable the destination circuit to be in a position to successfully take over performance of the workload. Using the earlier described example, such architectural state will typically comprise the current values stored in the architectural register file of the source processing circuitry, along with the current values of one or more special purpose registers of the source processing circuitry. Due to the architectural compatibility between the processing circuits 10, 50, if this current architectural state can be transferred from the source processing circuit to the destination processing circuit, the destination processing circuit will then be in a position to successfully take over performance of the workload from the source processing circuit.

Whilst architectural compatibility between the processing circuits 10, 50 facilitates transfer of the entire workload between the two processing circuits, in one embodiment the processing circuits 10, 50 are micro-architecturally different from each other, such that there are different performance characteristics, and hence energy consumption characteristics, associated with the two processing circuits. As discussed earlier, in one embodiment, the processing circuit 10 is a high performance, high energy consumption, processing circuit, while the processing circuit 50 is a lower performance, lower energy consumption, processing circuit. The two processing circuits can be micro-architecturally different from each other in a number of respects, but typically will have at least one of different execution pipeline lengths, and/or different execution resources. Differences in pipeline length will typically result in differences in operating frequency, which in turn will have an effect on performance. Similarly, differences in execution resources will have an effect on throughput and hence performance. Hence, by way of example, the processing circuitry 10 may have wider execution resources and/or more execution resources, in order to improve throughput. Further, the pipelines within the processor cores 15, 20 may be arranged to perform out-of-order superscalar processing, whilst the simpler core 55 within the energy efficient processing circuit 50 may be arranged as an in-order pipeline. A further discussion of micro-architectural differences will be provided later with reference to FIGS. 8A and 8B.

The generation of a transfer stimulus to cause the switch controller 120 to instigate a handover operation to transfer the workload from one processing circuit to another can be triggered for a variety of reasons. For example, in one embodiment, applications may be profiled and marked as 'big', 'little' or 'big/little', whereby the operating system can interface with the switch controller to move the workload accordingly. Hence, by such an approach, the generation of the transfer stimulus can be mapped to particular combinations of applications being executed, to ensure that when high performance is required, the workload is executed on the high performance processing circuit 10, whereas when that performance is not required, the energy efficient processing circuit 50 is instead used. In other embodiments, algorithms could be executed to dynamically determine when to trigger a transfer of the workload from one processing circuit to the other based on one or more inputs. For example, the performance counters of the processing circuitry can be set up to count performance sensitive events (for example the number of instructions executed, or the number of load-store operations). Coupled with a cycle counter or a system timer, this allows identification that a highly compute intensive application is executing that may be better served by switching to the higher performance processing circuitry, or identification of a large number of load-store operations indicating an IO intensive application which may be better served on the energy efficient processing circuitry, etc.

As a yet further example of when a transfer stimulus might be generated, the data processing system may include one or more thermal sensors 90 for monitoring the temperature of the data processing system during operation. It can be the case that modern high performance processing circuits, for example those running at GHz frequencies, sometimes reach, or exceed, the thermal limits that they were designed to operate within. By using such thermal sensors 90, it can be detected when such thermal limits are being reached, and under those conditions a transfer stimulus can be generated to trigger a transfer of the workload to a more energy efficient processing circuit in order to bring about an overall cooling of the data processing system. Hence, considering the example of FIG. 1 where the processing circuit 10 is a high performance processing circuit and the processing circuit 50 is a lower performance processing circuit consuming less energy, migration of the workload from the processing circuit 10 to the processing circuit 50 when the thermal limits of the device are being reached will bring about a subsequent cooling of the device, whilst still allowing continued program execution to take place, albeit at lower throughput.

Whilst in FIG. 1 two processing circuits 10, 50 are shown, it will be appreciated that the techniques of the above described embodiments can also be applied to systems incorporating more than two different processing circuits, allowing the data processing system to span a larger range of performance/energy levels. In such embodiments, each of the different processing circuits will be arranged to be architecturally compatible with each other to allow the ready migration of the entire workload between the processing circuits, but will also be micro-architecturally different to each other to allow choices to be made between the use of those processing circuits dependent on required performance/energy levels.

Figure 3:
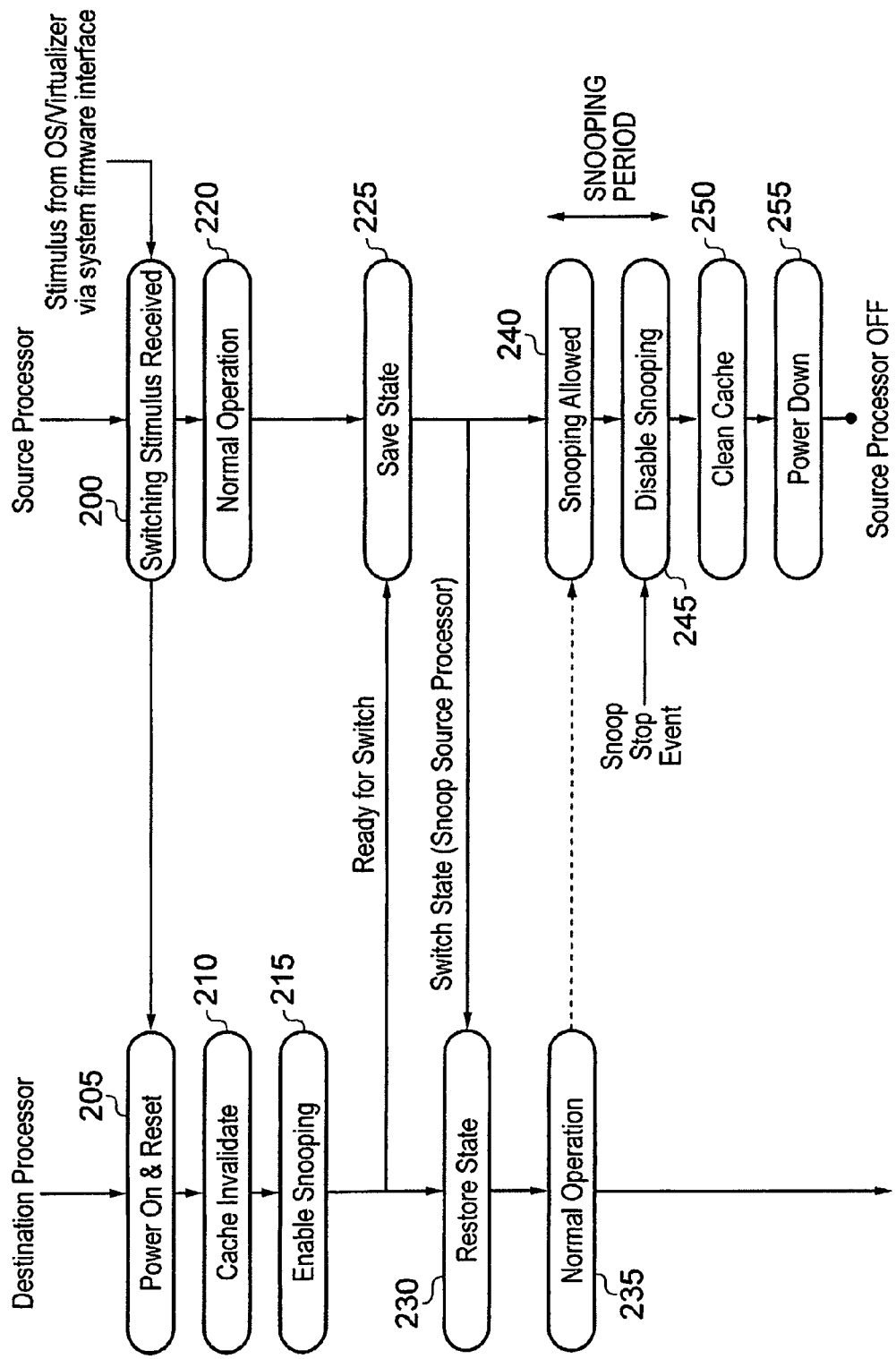
FIG. 3 is a diagram schematically illustrating the steps performed by both a source processor and a destination processor in response to a switching stimulus in order to transfer the workload from the source processor to the destination processor in accordance with one embodiment.

FIG. 3 is a flow diagram illustrating the sequence of steps performed on both the source processor and the destination processor when the workload is transferred from the source processor to the destination processor upon receipt of a transfer stimulus. Such a transfer stimulus may be generated by the operating system 115 or the virtualiser 120 via a system firmware interface resulting in the detection of the switching stimulus at step 200 by the source processor (which will be running not only the workload, but also the virtualiser software forming at least part of the switch controller 120). Receipt of the transfer stimulus (also referred to herein as the switching stimulus) at step 200 will cause the power controller 65 to initiate a power on and reset operation 205 on the destination processor. Following such power on and reset, the destination processor will invalidate its local cache at step 210, and then enable snooping at step 215. At this point, the destination processor will then signal to the source processor that it is ready for the transfer of the workload to take place, this signal causing the source processor to execute a save state operation at step 225. This save state operation will be discussed in more detail later with reference to FIG. 4A, but in one embodiment involves the source processing circuitry storing to its local cache any of its current architectural state which is not available from shared memory at the time the handover operation is initiated, and that is necessary for the destination processor to successfully take over performance of the workload.

Following the save state operation 225, a switch state signal will be issued to the destination processor 230 indicating to the destination processor that it should now begin snooping the source processor in order to retrieve the required architectural state. This process takes place via a restore state operation 230 which will be discussed in more detail later with reference to FIG. 4B, but which in one embodiment involves the destination processing circuitry initiating a sequence of accesses which are intercepted by the snoop control unit 75 within the interconnect 70, and which cause the cached copy of the architectural state in the source processor's local cache to be retrieved and returned to the destination processor.

Following step 230, the destination processor is then in a position to take over processing of the workload, and accordingly normal operation begins at step 235.

In one embodiment, once normal operation begins on the destination processor, the source processor's cache could be cleaned as indicated at step 250, in order to flush any dirty data to the shared memory 80, and then the source processor could be powered down at step 255. However, in one embodiment, to further improve the efficiency of the destination processor, the source processor is arranged to remain powered up for a period of time referred to in FIG. 3 as the snooping period. During this time, at least one of the caches of the source circuit remains powered up, so that its contents can be snooped by the snoop control circuit 75 in response to access requests issued by the destination processor. Following the transfer of the entire workload using the process described in FIG. 3, it is expected that for at least an initial period of time after which the destination processor begins operation of the workload, some of the data required during the performance of the workload will reside in the source processor's cache. If the source processor had flushed its contents to memory, and been powered down, then the destination processor would during these early stages operate relatively inefficiently, since there would be a lot of cache misses in its local cache, and a lot of fetching of data from shared memory, resulting in a significant performance impact whilst the destination processor's cache is "warmed up", i.e. filled with data values required by the destination processor circuit to perform the operations specified by the workload. However, by leaving the source processor's cache powered up during the snooping period, the snoop control circuit 75 will be able to service a lot of these cache miss requests with reference to the source circuit's cache, yielding significant performance benefits when compared with the retrieval of that data from shared memory 80.

However, this performance benefit is only expected to last for a certain amount of time following the switch, after which the contents of the source processor's cache will become stale. Accordingly, at some point a snoop stop event will be generated to disable snooping at step 245, whereafter the source processor's cache will be cleaned at step 250, and then the source processor will be powered down at step 255. A discussion of the various scenarios under which the snoop stop event may be generated will be discussed in more detail later with reference to FIG. 6G.

Figure 4A:
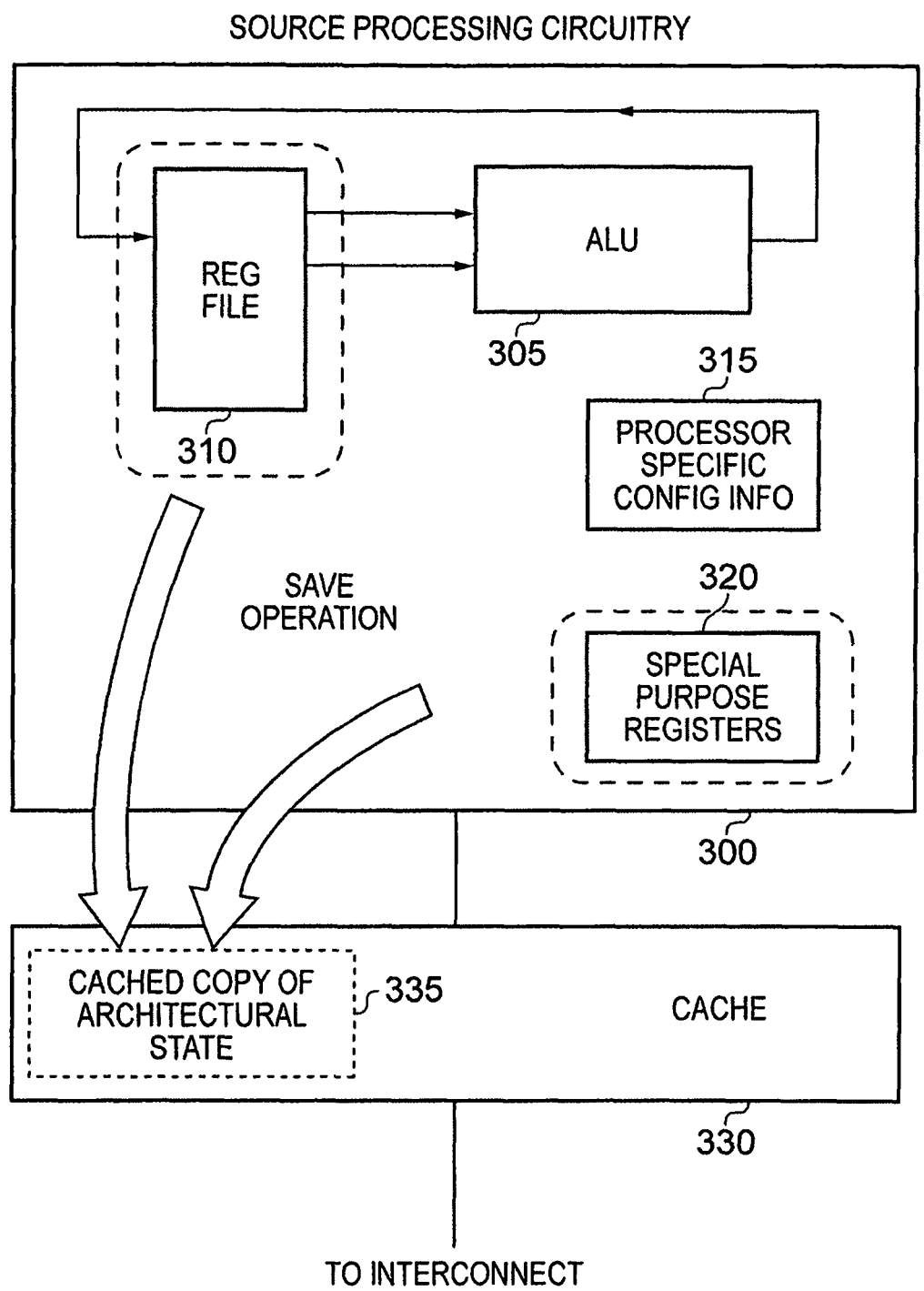
FIG. 4A schematically illustrates the storing of the source processing circuitry's current architectural state into its associated cache during the save operation of FIG. 3.

FIG. 4A schematically illustrates the save operation performed at step 225 in FIG. 3 in accordance with one embodiment. In particular, in one embodiment, the architectural state that needs to be stored from the source processing circuitry 300 to the local cache 330 consists of the contents of a register file 310 referenced by an arithmetic logic unit (ALU) 305 during the performance of data processing operations, along with the contents of various special purpose registers 320 identifying a variety of pieces of information required by the workload to successfully enable that workload to be taken over by the destination processing circuitry. The contents of the special purpose registers 320 will include for example a program counter value identifying a current instruction being executed, along with various other information. For example, other special purpose registers include processor status registers (e.g. the CPSR and SPSR in the ARM architecture) that hold control bits for processor mode, interrupt masking, execution state and flags. Other special purpose registers include architectural control (the CP15 system control register in the ARM architecture) that hold bits to alter data endianness, turn the MMU on or off, turn data/instruction caches on or off, etc. Other special purpose registers in CP15 store exception address and status information.

As schematically illustrated in FIG. 4A, the source processing circuit 300 will also typically hold some processor specific configuration information 315, but this information does not need saving to the cache 330, since it will not be applicable to the destination processing circuitry. The processor specific configuration information 315 is typically hard-coded in the source processing circuit 300 using logic constants, and may include, for example, the contents of the CP15 processor ID register (which will be different for each processing circuit) or the contents of the CP15 cache type register (which will depend on the configuration of the caches 25, 30, 60, for example indicating that the caches have different line lengths). When the operating system 115 requires a piece of processor specific configuration information 315, then unless the processor is already in hypervisor mode, an execution trap to hypervisor mode occurs. In response, the virtualiser 120 may in one embodiment indicate the value of the information requested, but in another embodiment will return a "virtual" value. In the case of the processor ID value, this virtual value can be chosen to be the same for both "big" and "little" processors, thereby causing the actual hardware configuration to be hidden from the operating system 115 by the virtualiser 120.

As illustrated schematically in FIG. 4A, during the save operation, the contents of the register file 310 and of the special purpose registers 320 is stored by the source processing circuitry into the cache 330 to form a cached copy 335. This cached copy is then marked as shareable, which allows the destination processor to snoop this state via the snoop control unit 75.

Figure 4B:
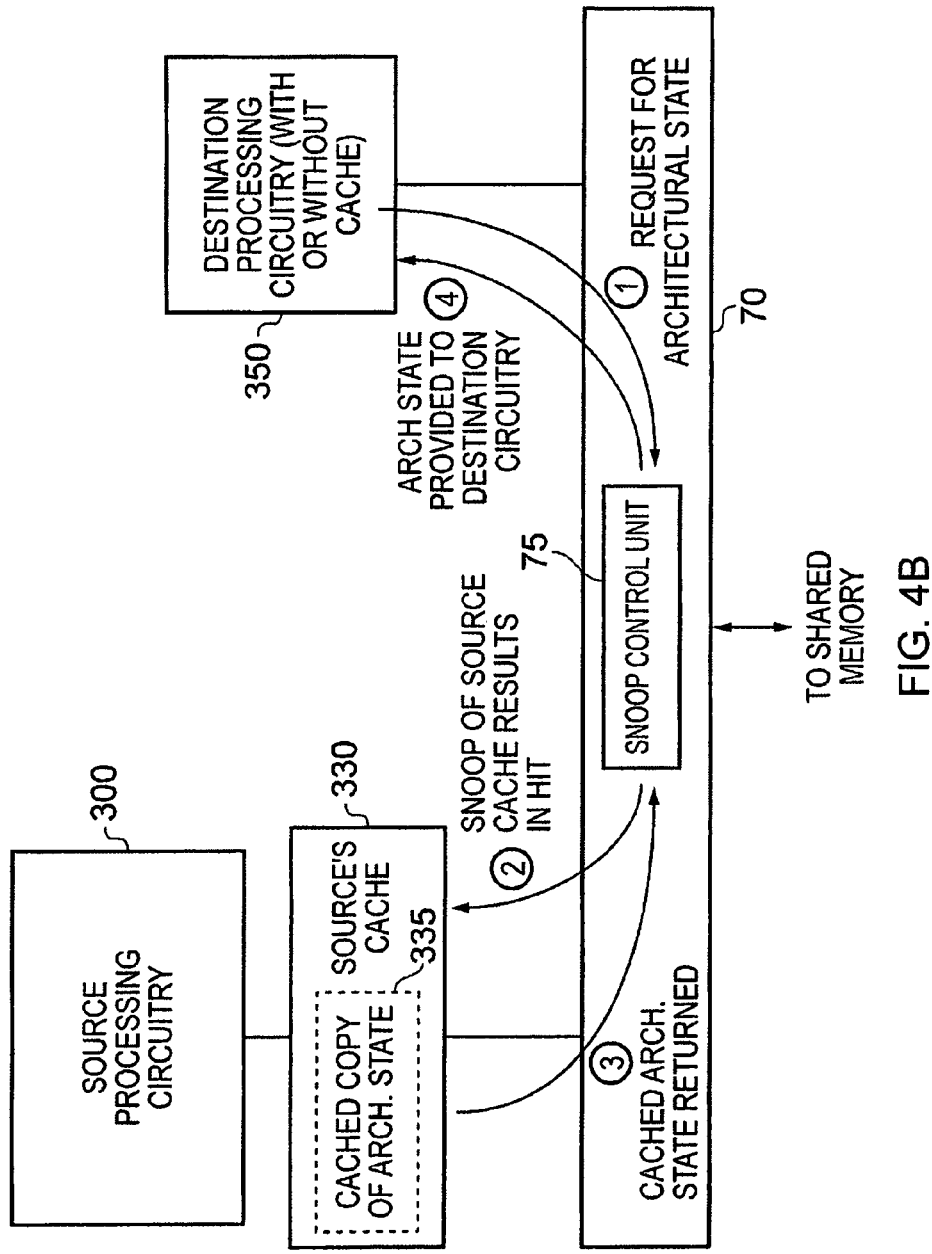
FIG. 4B schematically illustrates the use of the snoop control unit to control the transfer of the source processing circuit's current architectural state to the destination processing circuit during the restore operation of FIG. 3.

The restore operation subsequently performed on the destination processor is then illustrated schematically in FIG. 4B. In particular, the destination processing circuitry 350, which may or may not have its own local cache) will issue a request for a particular item of architectural state, with that request being intercepted by the snoop control unit 75. The snoop control unit will then issue a snoop request to the source processing circuit's local cache 330 to determine whether that item of architectural state is present in the source's cache. Because of the steps taken during the save operation discussed in FIG. 4A, a hit will be detected in the source's cache 330, resulting in that cached architectural state being returned via the snoop control unit 75 to the destination processing circuit 350. This process can be repeated iteratively until all of the items of architectural state have been retrieved via snooping of the source processing circuit's cache. Any processor specific configuration information relevant to destination processing circuit 350 is typically hard-coded in the destination processing circuit 350 as discussed earlier. Thus, once the restore operation has been completed, the destination processing circuitry then has all the information required to enable it to successfully take over handling of the workload.

Further, in one embodiment, regardless of whether the workload 100 is being performed by the "big" processing circuit 10 or "little" processing circuit 50, the virtualiser 120 provides the operating system 115 with virtual configuration information having the same values, and so the hardware differences between the "big" and "little" processing circuits 10, 50 are masked from the operating system 115 by the virtualiser 120. This means that the operating system 115 is unaware that the performance of the workload 100 has been transferred to a different hardware platform.

In accordance with the save and restore operations described with reference to FIGS. 4A and 4B, the various processor instances 10, 50 are arranged to be hardware cache coherent with one another in order to reduce the amount of time, energy and hardware complexity involved in transferring the architectural state from the source processor to the destination processor. The technique uses the source processor's local cache to store all of the state that must be transferred from the source processor to the destination processor and which is not available from shared memory at the time the transfer operation takes place. Because the state is marked as shareable within the source processor's cache, this allows the hardware cache coherent destination processor to snoop this state during the transfer operation. By using such a technique, it is possible to transfer the state between the processor instances without the need to save that state either to main memory or to a local memory mapped storage element. This hence yields significant performance and energy consumption benefits, increasing the variety of situations in which it would be appropriate to switch the workload in order to seek to realise energy consumption benefits.

Figure 5:
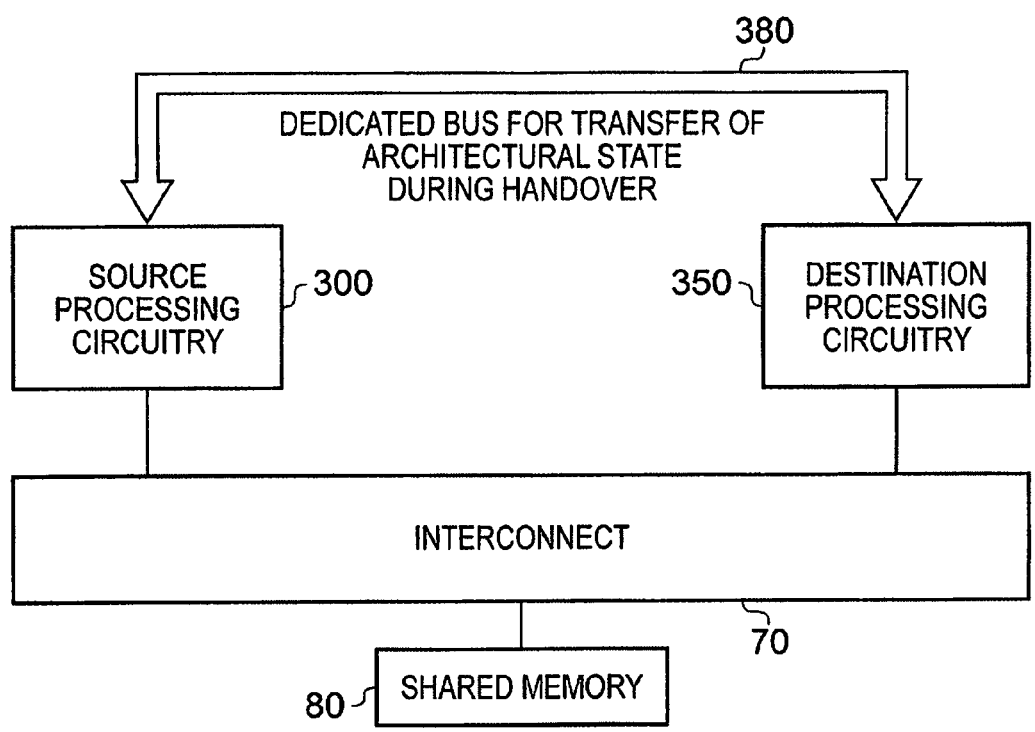
FIG. 5 illustrates an alternative structure for providing an accelerated mechanism for transferring the current architectural state of the source processing circuitry to the destination processing circuitry during the transfer operation in accordance with one embodiment.

However, whilst the technique of using cache coherence as described above provides one accelerated mechanism for making the current architectural state available to the destination processor without routing of the current architectural state via the shared memory, it is not the only way in which such an accelerated mechanism could be implemented. For example, FIG. 5 illustrates an alternative mechanism where a dedicated bus 380 is provided between the source processing circuitry 300 and the destination processing circuitry 350 in order to allow the architectural state to be transferred during the handover operation. Hence, in such embodiments, the save and restore operations 225, 230 of FIG. 3 are replaced with an alternative transfer mechanism utilising the dedicated bus 380. Whilst such an approach will typically have a higher hardware cost than employing the cache coherency approach (the cache coherency approach typically making use of hardware already in place within the data processing system), it would provide an even faster way of performing the switching, which could be beneficial in certain implementations.

FIGS. 6A to 6I schematically illustrate a series of steps that are performed in order to transfer performance of a workload from the source processing circuitry 300 to the destination processing circuitry 350. The source processing circuitry 300 is whichever of the processing circuits 10, 50 is performing the workload before the transfer, with the destination processing circuitry being the other of the processing circuits 10, 50.

Figure 6A:
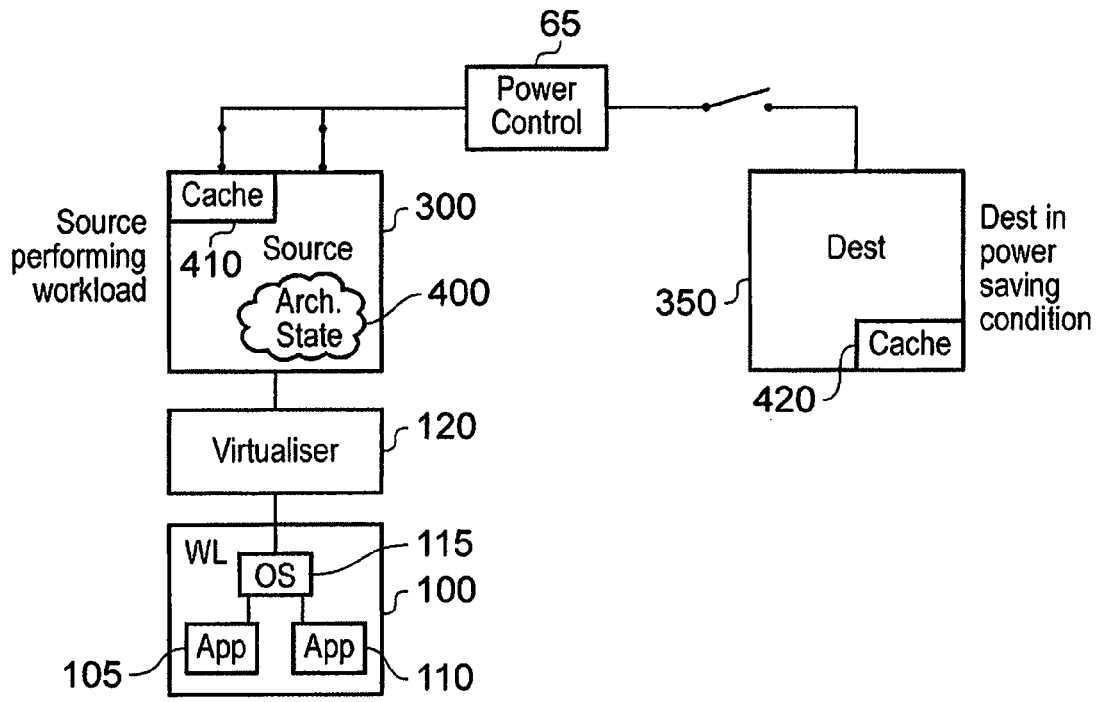
FIGS. 6A to 6I schematically illustrate the steps performed to transfer a workload from a source processing circuit to a destination processing circuit in accordance with one embodiment.

FIG. 6A shows the system in an initial state in which the source processing circuitry 300 is powered by the power controller 65 and is performing the processing workload 100, while the destination processing circuitry 350 is in the power saving condition. In this embodiment, the power saving condition is a power off condition, but as mentioned above other types of power saving condition may also be used. The workload 100, including applications 105, 110 and an operating system 115 for running the applications 105, 110, is abstracted from the hardware platform of the source processing circuitry 300 by the virtualiser 120. While performing the workload 100, the source processing circuitry 300 maintains architectural state 400, which may comprise for example the contents of the register file 310 and special purpose registers 320 as shown in FIG. 4A.

Figure 6B:
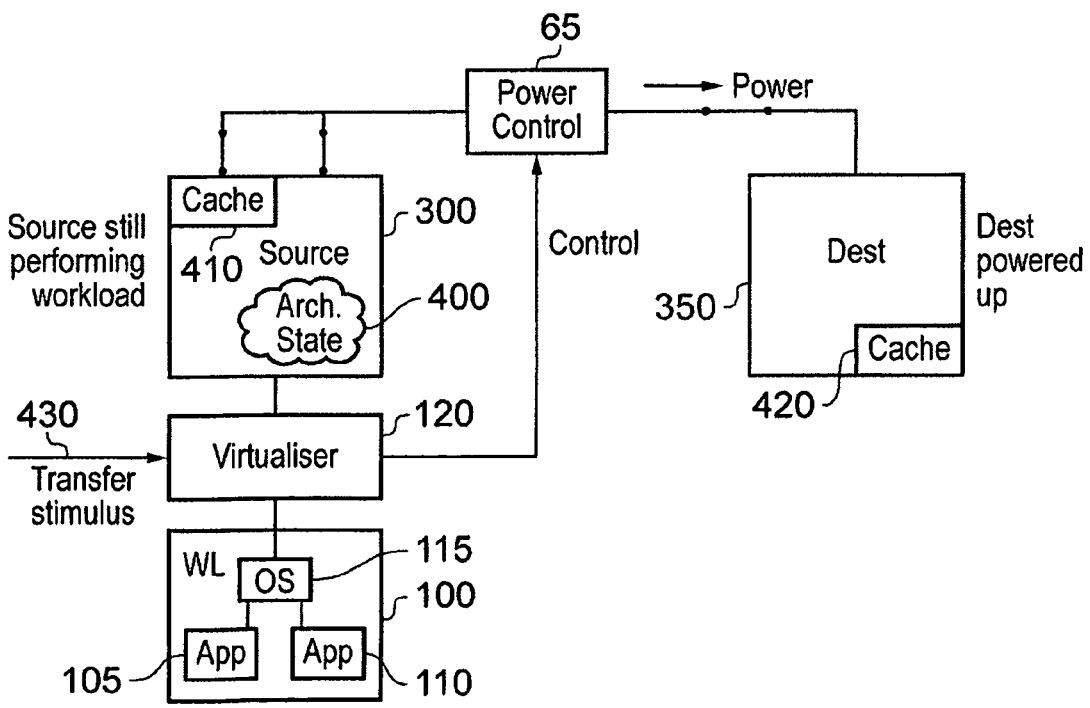

In FIG. 6B, a transfer stimulus 430 is detected by the virtualiser 120. While the transfer stimulus 430 is shown in FIG. 6B as an external event (e.g. detection of thermal runaway by the thermal sensor 90), the transfer stimulus 430 could also be an event triggered by the virtualiser 120 itself or by the operating system 115 (e.g. the operating system 115 could be configured to inform the virtualiser 120 when a particular type of application is to be processed). The virtualiser 120 responds to the transfer stimulus 430 by controlling the power controller 65 to supply power to the destination processing circuitry 350, in order to place the destination processing circuitry 350 in a powered state.

Figure 6C:
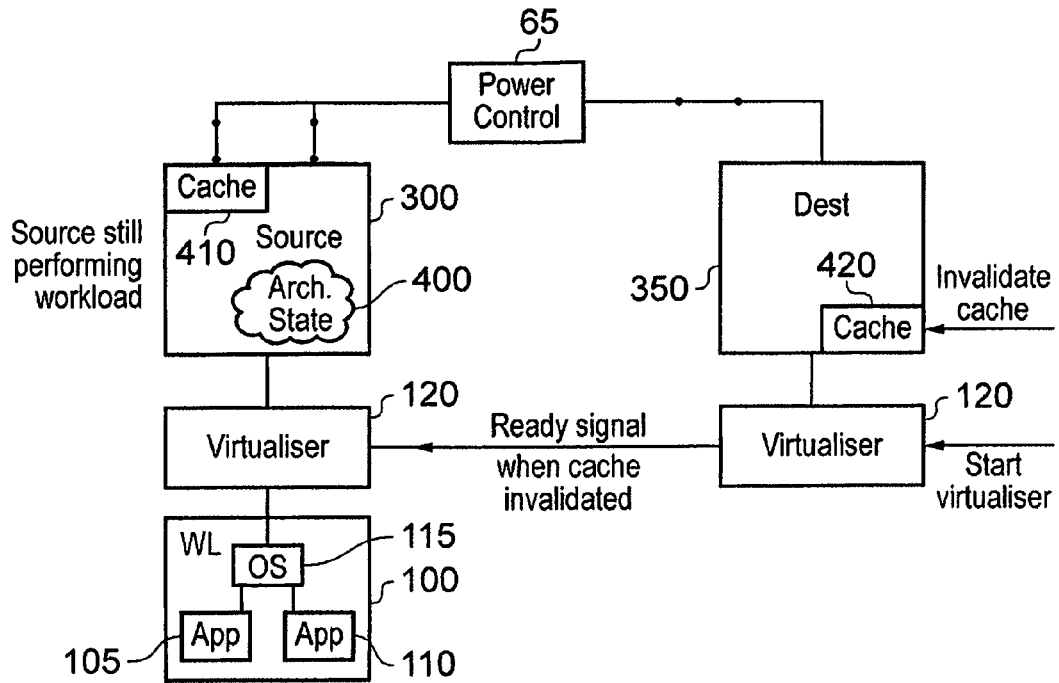

In FIG. 6C, the destination processing circuitry 350 starts executing the virtualiser 120. The virtualiser 120 controls the destination processing circuitry 350 to invalidate its cache 420, in order to prevent processing errors caused by erroneous data values which may be present in the cache 420 on powering up the destination processing circuitry 350. While the destination cache 420 is being invalidated, the source processing circuitry 350 continues to perform the workload 100. When invalidation of the destination cache 420 is complete, the virtualiser 120 controls the destination processing circuitry 350 to signal to the source processing circuitry 300 that it is ready for the handover of the workload 100. By continuing processing of the workload 100 on the source processing circuitry 300 until the destination processing circuitry 350 is ready for the handover operation, the performance impact of the handover can be reduced.

Figure 6D:
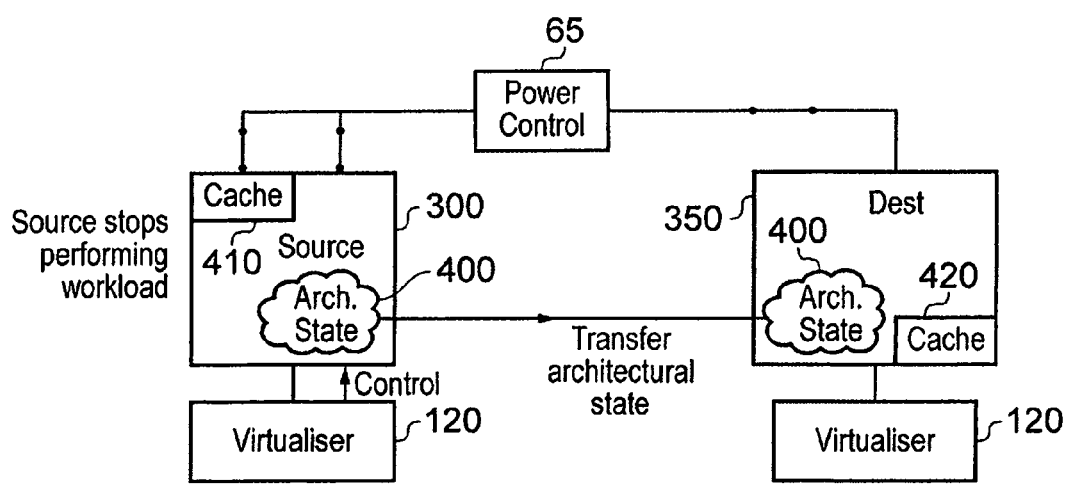
Figure 6E:
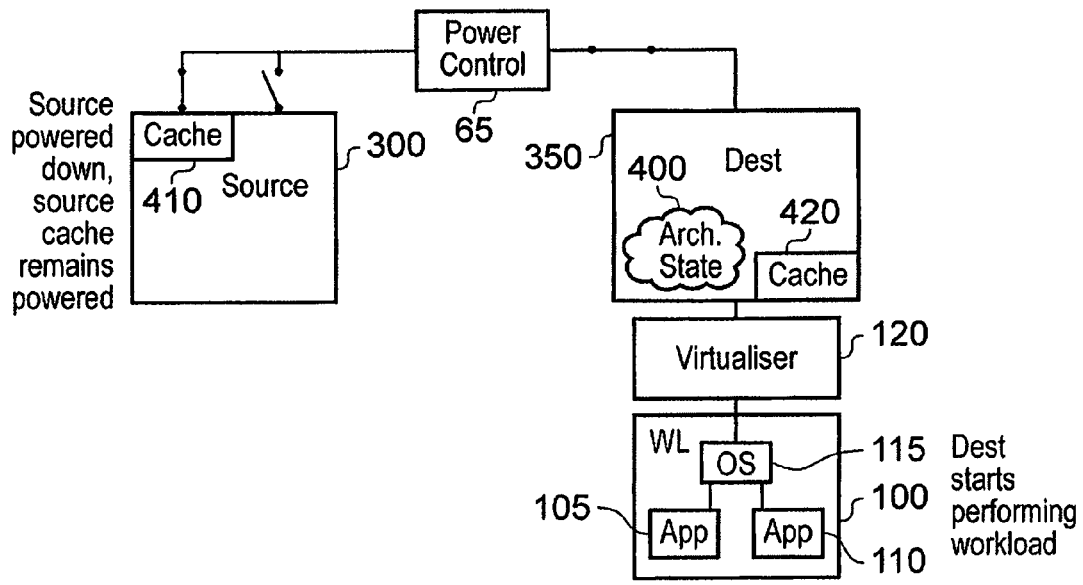

At the next stage, shown in FIG. 6D, the source processing circuitry 300 stops performing the workload 100. During this stage, neither the source processing circuitry 300 nor the destination processing circuitry 350 performs the workload 100. A copy of the architectural state 400 is transferred from the source processing circuitry 300 to the destination processing circuitry 350. For example, the architectural state 400 can be saved to the source cache 410 and restored to the destination processing circuitry 350 as shown in FIGS. 4A and 4B, or can be transferred over a dedicated bus as shown in FIG. 5. The architectural state 400 contains all the state information required for the destination processing circuitry 350 to perform the workload 100, other than the information already present in the shared memory 80.

Having transferred the architectural state 400 to the destination processing circuitry 350, the source processing circuitry 300 is placed in the power saving state by the power control circuitry 65 (see FIG. 6E), with the exception that the source cache 410 remains powered. Meanwhile, the destination processing circuitry 350 begins performing the workload 100 using the transferred architectural state 400.

Figure 6F:
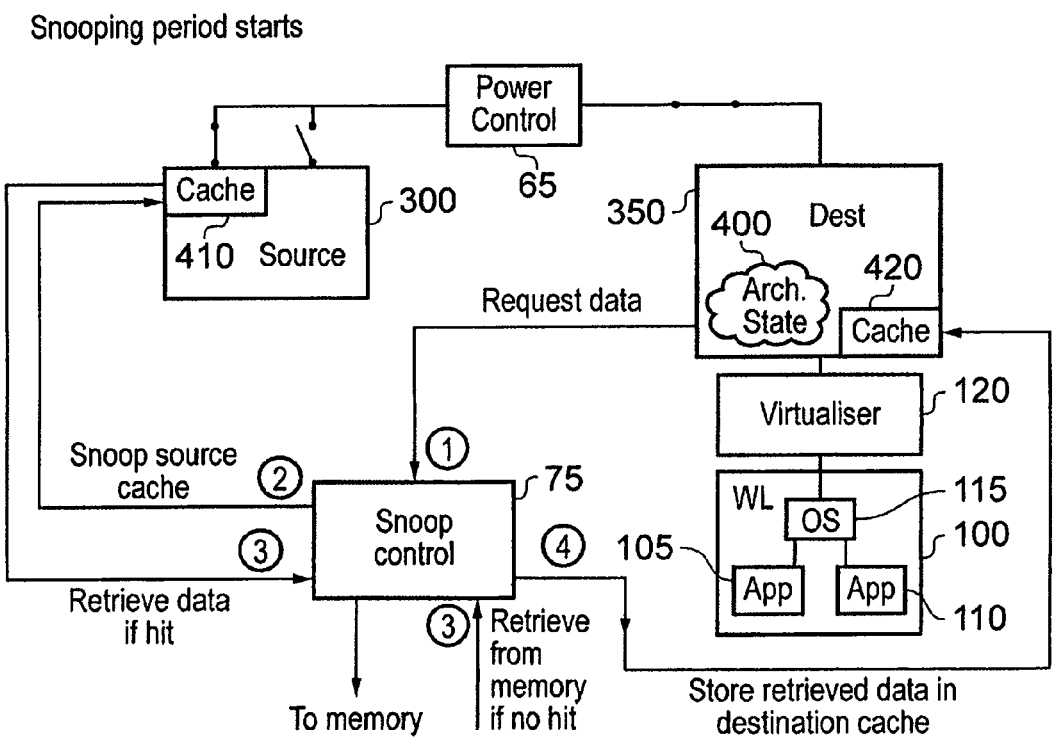

When the destination processing circuitry 350 begins processing the workload 100, the snooping period begins (see FIG. 6F). During the snooping period, the snoop control unit 75 can snoop the data stored in the source cache 410 and retrieve the data on behalf of the destination processing circuitry 350. When the destination processing circuitry 350 requests data that is not present in the destination cache 420, the destination processing circuitry 350 requests data from the snoop control unit 75. The snoop control unit 75 then snoops the source cache 410, and if the snoop results in a cache hit then the snoop control unit 75 retrieves the snooped data from the source cache 410 and returns it to the destination processing circuitry 350 where the snooped data can be stored in the destination cache 420. On the other hand, if the snoop results in a cache miss in the source cache 410 then the requested data is fetched from the shared memory 80 and returned to the destination processing circuitry 350. Since accesses to data in the source cache 410 are faster and require less energy than accesses to shared memory 80, snooping the source cache 410 for a period improves processing performance and reduces energy consumption during an initial period following the handover of the workload 100 to the destination processing circuitry 350.

Figure 6G:
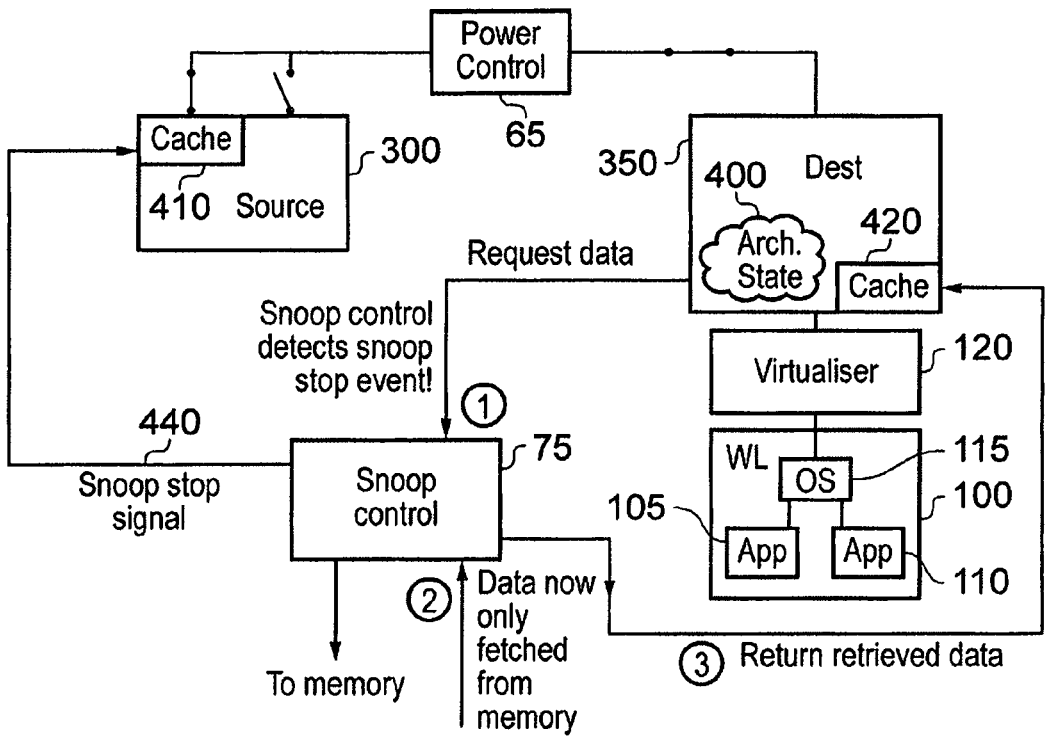

At the step shown in FIG. 6G, the snoop control unit 75 detects a snoop stop event which indicates that it is no longer efficient to maintain the source cache 410 in the powered state. The snoop stop event triggers the end of the snooping period. The snoop stop event may be any one of a set of snoop stop events monitored by the snoop control circuitry 75. For example, the set of snoop stop events can include any one or more of the following events:

a) when the percentage or fraction of snoop hits that result in a cache hit in the source cache 410 (i.e. a quantity proportional to number of snoop hits/number of total snoops) drops below a predetermined threshold level after the destination processing circuitry 350 has started performing the workload 100;

b) when the number of transactions, or the number of transactions of a predetermined type (e.g. cacheable transactions), performed since the destination processing circuitry 350 began performing the workload 100 exceeds a predetermined threshold;

c) when the number of processing cycles elapsed since the destination processing circuitry 350 began performing the workload 100 exceeds a predetermined threshold;

d) when a particular region of the shared memory 80 is accessed for the first time since the destination processing circuitry 350 began performing the workload 100;

e) when a particular region of the shared memory 80, which was accessed for an initial period after the destination processing circuitry 350 began performing the workload 100, is not accessed for a predetermined number of cycles or a predetermined period of time;

f) when the destination processing circuitry 350 writes to a predetermined memory location for the first time since starting to perform the transferred workload 100.

These snoop stop events can be detected using programmable counters in the coherent interconnect 70 that includes the snoop control unit 75. Other types of snoop stop event may also be included in the set of snoop stop events.

On detecting a snoop stop event, the snoop control unit 75 sends a snoop stop signal 440 to the source processor 300. The snoop control unit 75 stops snooping the source cache 410 and from now on responds to data access requests from the destination processing circuitry 350 by fetching the requested data from shared memory 80 and returning the fetched data to the destination processing circuitry 350, where the fetched data can be cached.

Figure 6H:
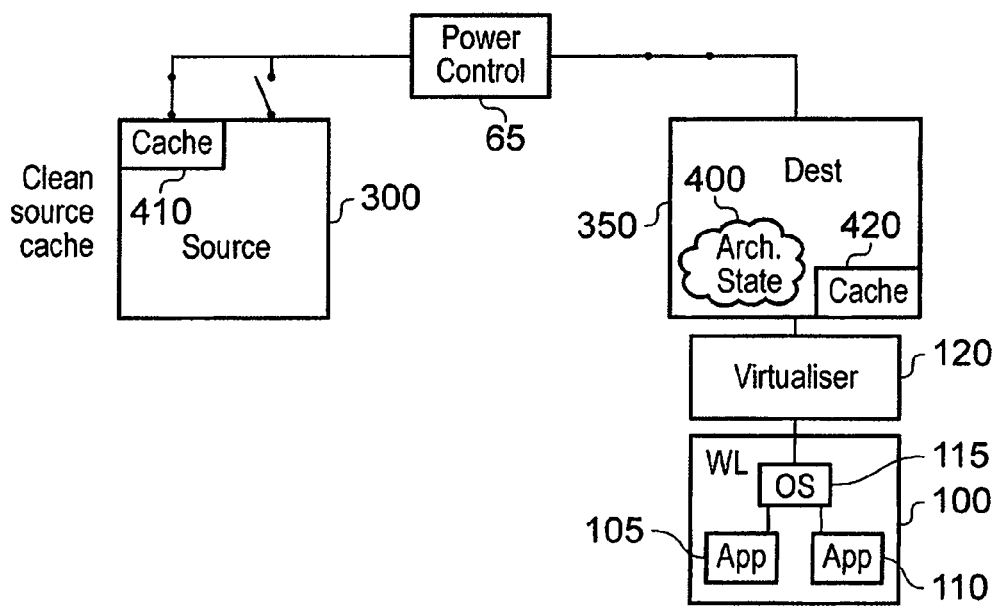

In FIG. 6H, the source cache's control circuit is responsive to the snoop stop signal 440 to clean the cache 410 in order to save to the shared memory 80 any valid and dirty data values (i.e. whose cached value is more up-to-date than the corresponding value in shared memory 80).

Figure 6I:
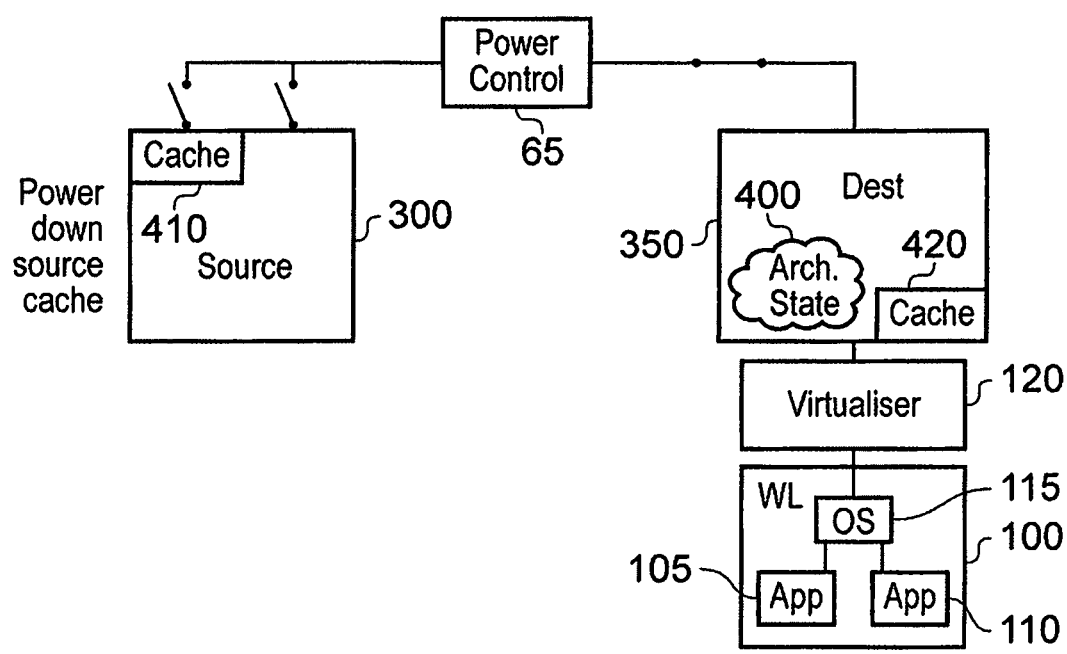

In FIG. 6I, the source cache 410 is then powered down by the power controller 65 so that the source processing circuitry 300 is entirely in the power saving state. The destination processing circuitry 350 continues to perform the workload 100. From the point of view of the operating system 115, the situation is now the same as in FIG. 6A. The operating system 115 is not aware that execution of the workload has transferred from one processing circuit to another processing circuit. When another transfer stimulus occurs, then the same steps of FIGS. 6A to 6I can be used to switch performance of the workload back to the first processor (in this case which of the processing circuits 10, 50 are the "source processing circuitry" and "destination processing circuitry" will be reversed).

In the embodiment of FIGS. 6A to 6I, independent power control to the cache 410 and the source processing circuitry 300 is available so that the source processing circuitry 300, other than the source cache 410, can be powered down once the destination processing circuitry 350 has started performing the workload (see FIG. 6E), while only the cache 410 of the source processing circuitry 350 remains in the powered state (see FIGS. 6F to 6H). The source cache 410 is then powered down in FIG. 6I. This approach can be useful to save energy, especially when the source processing circuitry 300 is the "big" processing circuit 10.

However, it is also possible to continue to power the entire source processing circuitry 300 during the snooping period, and to then place the source processing circuitry 300 as a whole in the power saving state at FIG. 6I, following the end of the snooping period and the cleaning of the source cache 410. This may be more useful in the case where the source cache 410 is too deeply embedded with the source processor core to be able to be powered independently from the source processor core. This approach can also be more practical when the source processor is the "little" processing circuit 50, whose power consumption is insignificant in comparison to the "big" processing circuit 10, since once the "big" processing circuit 10 has started processing the transferred workload 100 then switching the "little" processing circuit 50, other than the cache 60, to the power saving state during the snooping period may have little effect on the overall power consumption of the system. This may mean that the extra hardware complexity of providing individual power control to the "little" processing circuit 50 and the "little" core's cache 60 may not be justified.

In some situations, it may be known before the workload transfer that the data stored in the source cache 410 will not be needed by the destination processing circuitry 350 when it begins to perform the workload 100. For example, the source processing circuitry 300 may just have completed an application when the transfer occurs, and therefore the data in the source cache 410 at the time of the transfer relates to the completed application and not the application to be performed by the destination processing circuitry 350 after the transfer. In such a case, a snoop override controller can trigger the virtualiser 120 and snoop control circuitry 75 to override the snooping of the source cache 410 and to control the source processing circuit 300 to clean and power down the source cache 410 without waiting for a snoop stop event to signal the end of the snooping period. In this case, the technique of FIGS. 6A to 6I would jump from the step of FIG. 6E straight to the step of FIG. 6G, without the step of FIG. 6F in which data is snooped from the source cache 410. Thus, if it is known in advance that the data in the source cache 410 will not be useful for the destination processing circuitry 350, power can be saved by placing the source cache 410 and source processing circuitry 300 in the power saving condition without waiting for a snoop stop event. The snoop override controller can be part of the virtualiser 120, or can be implemented as firmware executing on the source processing circuitry 300. The snoop override controller could also be implemented as a combination of elements, for example the operating system 115 could inform the virtualiser 120 when an application has finished, and the virtualiser 120 could then override snooping of the source cache 410 if a transfer occurs when an application has finished.

Figure 7:
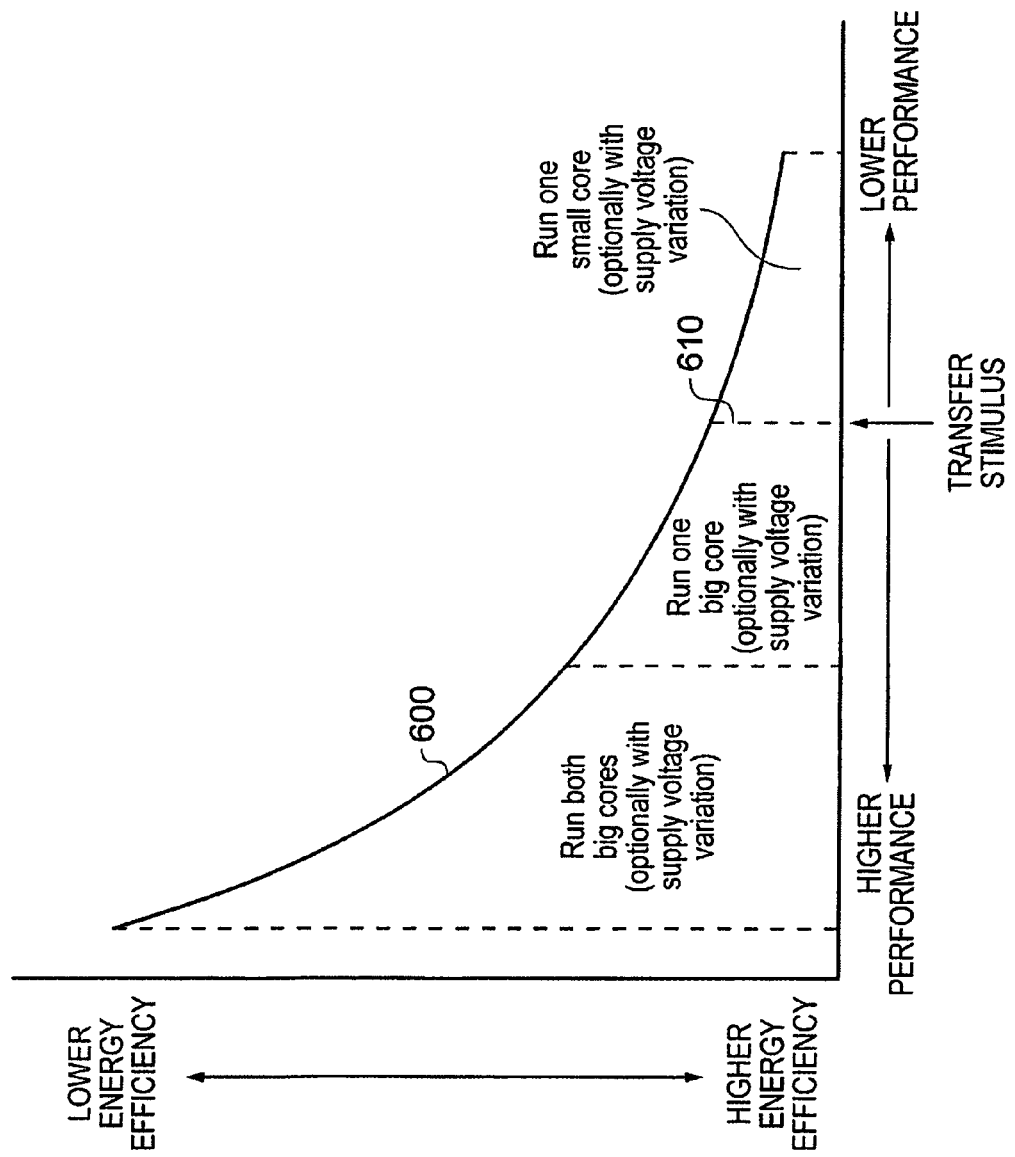
FIG. 7 is a graph showing energy efficiency variation with performance, and illustrating how the various processor cores illustrated in FIG. 1 are used at various points along that curve in accordance with one embodiment.

FIG. 7 is a graph on which the line 600 illustrates how energy consumption varies with performance. For various portions of this graph, the data processing system can be arranged to utilise different combinations of the processor cores 15, 20, 55 illustrated in FIG. 1 in order to seek to obtain the appropriate trade-off between performance and energy consumption. Hence, by way of example, when a number of very high performance tasks need to be executed, it is possible to run both of the big cores 15, 20 of the processing circuit 10 in order to achieve the desired performance. Optionally supply voltage variation techniques can be used to allow some variation in performance and energy consumption when utilising these two cores.

When the performance requirements drop to a level where the required performance can be achieved using only one of the big cores, then the tasks can be migrated on to just one of the big cores 15, 20, with the other core being powered down or put into some other power saving condition. Again supply voltage variation can be used to allow some variation between performance and energy consumption when using such a single big core. It should be noted that the transition from two big cores to one big core will not require a generation of a transfer stimulus, nor the use of the above described techniques for transferring workload, since in all instances it is the processing circuit 10 that is being utilised, and the processing circuit 50 will be in a power saving condition. However, as indicated by the dotted line 610 in FIG. 7, when the performance drops to a level where the small core is able to achieve the required performance, then a transfer stimulus can be generated to trigger the earlier described mechanism for transferring the entire workload from the processing circuit 10 to the processing circuit 50, such that the entire workload is then run on the small core 55, with the processing circuit 10 being placed into a power saving condition. Again, supply voltage variation can be used to allow some variation in the performance and energy consumption of the small core 55.

Figure 8A:
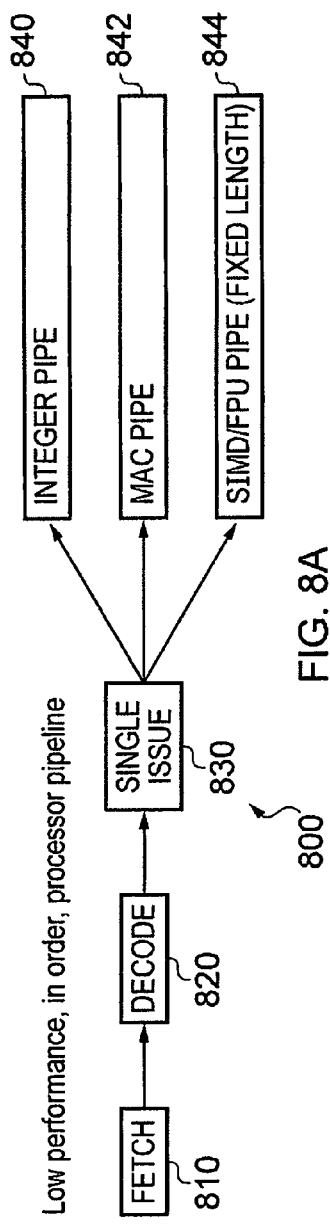
FIGS. 8A and 8B schematically illustrate a low performance processor pipeline and a high performance processor pipeline, respectively, as utilised in one embodiment.
Figure 8B:
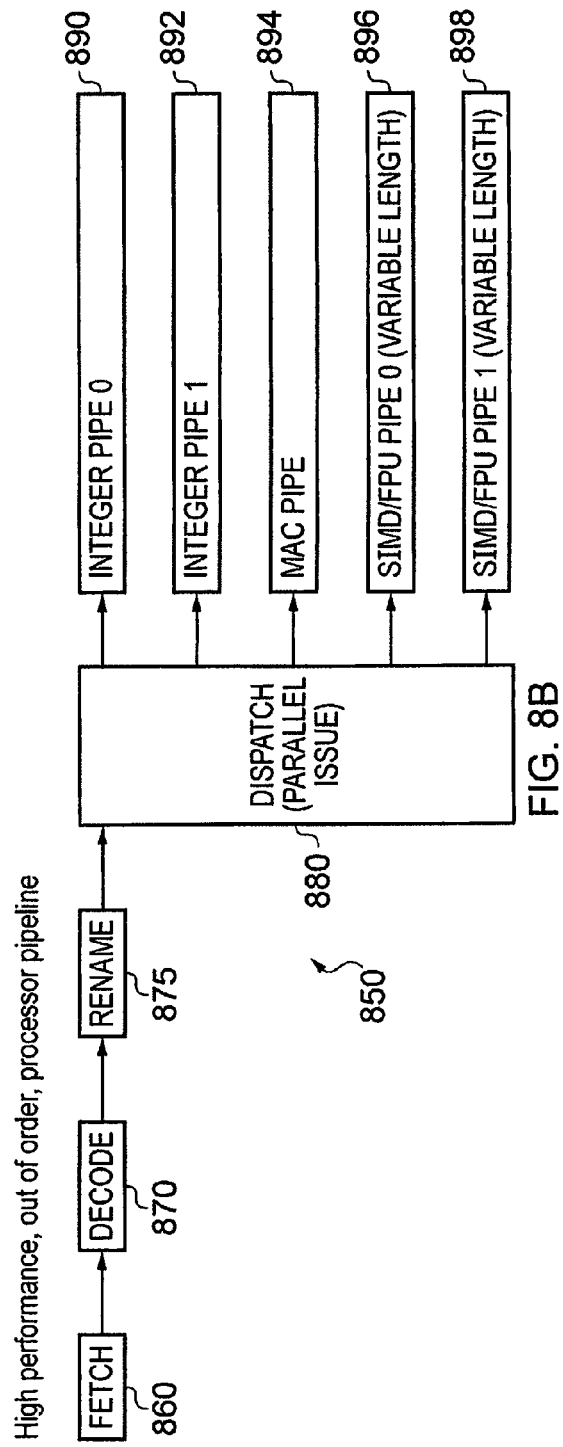

FIGS. 8A and 8B respectively illustrate micro-architectural differences between a low performance processor pipeline 800 and a high performance processor pipeline 850 according to one embodiment. The low performance processor pipeline 800 of FIG. 8A would be suitable for the little processing core 55 of FIG. 1, whereas the high performance processor pipeline 850 of FIG. 8B would be suitable for the big cores 15, 20.

The low performance processor pipeline 800 of FIG. 8A comprises a fetch stage 810 for fetching instructions from memory 80, a decode stage 820 for decoding the fetched instructions, an issue stage 830 for issuing instructions for execution, and multiple execution pipelines including an integer pipeline 840 for performing integer operations, a MAC pipeline 842 for performing multiply accumulate operations, and a SIMD/FPU pipeline 844 for performing SIMD (single instruction, multiple data) operations or floating point operations. In the low performance processor pipeline 800, the issue stage 830 issues a single instruction at a time, and issues the instructions in the order in which the instructions are fetched.

The high performance processor pipeline 850 of FIG. 8B comprises a fetch stage 860 for fetching instructions from memory 80, a decode stage 870 for decoding the fetched instructions, a rename stage 875 for renaming registers specified in the decoded instructions, a dispatch stage 880 for dispatching instructions for execution, and multiple execution pipelines including two integer pipelines 890, 892, a MAC pipeline 894, and two SIMD/FPU pipelines 896, 898. In the high performance processor pipeline 850, the dispatch stage 880 is a parallel issue stage which can issue multiple instructions to different ones of the pipelines 890, 892, 894, 896, 898 at once. The dispatch stage 880 can also issue the instructions out-of-order. Unlike in the low performance processor pipeline 800, the SIMD/FPU pipelines 896, 898 are variable length, which means that operations proceeding through the SIMD/FPU pipelines 896, 898 can be controlled to skip certain stages. An advantage of such an approach is that if multiple execution pipelines each have different resources, there is no need to artificially lengthen the shortest pipeline to make it the same length as the longest pipeline, but instead logic is required to deal with the out-of-order nature of the results produced by the different pipelines (for example to place everything back in order if a processing exception occurs).

The rename stage 875 is provided to map register specifiers, which are included in program instructions and identify particular architectural registers when viewed from a programmer's model point of view, to physical registers which are the actual registers of the hardware platform. The rename stage 875 enables a larger pool of physical registers to be provided by the microprocessor than are present within the programmer's model view of the microprocessor. This larger pool of physical registers is useful during out-of-order execution because it enables hazards such as write-after-write (WAW) hazards to be avoided by mapping the same architectural register specified in two or more different instructions to two or more different physical registers, so that the different instructions can be executed concurrently. For more details of register renaming techniques, the reader is referred to commonly owned US patent application US 2008/114966 and U.S. Pat. No. 7,590,826.

The low-performance pipeline 800 and high-performance pipeline 850 are micro-architecturally different in a number of ways. The micro-architectural differences can include:

a) the pipelines having different stages. For example, the high-performance pipeline 850 has a rename stage 875 which is not present in the low-performance pipeline 800.

b) the pipeline stages having different capabilities. For example, the issue stage 830 of the low-performance pipeline 800 is capable only of single issue of instructions, whereas the dispatch stage 880 of the high performance pipeline 850 can issue instructions in parallel. Parallel issue improves the processing throughput of the pipeline and so improves performance.

c) the pipeline stages having different lengths. For example, the decode stage 870 of the high-performance pipeline 850 may include three sub-stages whereas the decode stage 820 of the low-performance pipeline 800 may include only a single sub-stage. The longer a pipeline stage (the greater the number of sub-stages), the greater the number of instructions which can be in flight at the same time, and so greater the operating frequency at which the pipeline can operate, which results in a higher level of performance.

d) a different number of execution pipelines (e.g. the high-performance pipeline 850 has more execution pipelines than the low-performance pipeline 800). By providing more execution pipelines, more instructions can be processed in parallel and so performance is increased.

e) providing in-order execution (as in pipeline 800) or out-of-order execution (as in pipeline 850). When instructions can be executed out-of-order, then performance is improved since the execution of instructions can be dynamically scheduled to optimize performance. For example, in the low-performance in-order pipeline 800 a series of MAC instructions would need to be executed one by one by the MAC pipeline 842 before a later instruction could be executed by one of the integer pipeline 840 and SIMD/floating point pipeline 844. In contrast, in the high-performance pipeline 850 then the MAC instructions could be executed by the MAC pipe 894, while (subject to any data hazards which cannot be resolved by renaming) a later instruction using a different execution pipeline 890, 892, 896, 898 can be executed in parallel with the MAC instructions. This means that out-of-order execution can improve processing performance.

These, and other examples of, micro-architectural differences result in the pipeline 850 providing higher performance processing than the pipeline 800. On the other hand, the micro-architectural differences also make the pipeline 850 consume more energy than the pipeline 800. Thus, providing micro-architecturally different pipelines 800, 850 enables the processing of the workload to be optimised for either high performance (by using a "big" processing circuit 10 having the high-performance pipeline 850) or energy efficiency (by using a "little" processing circuit 50 having the low-performance pipeline 800).

Figure 9:
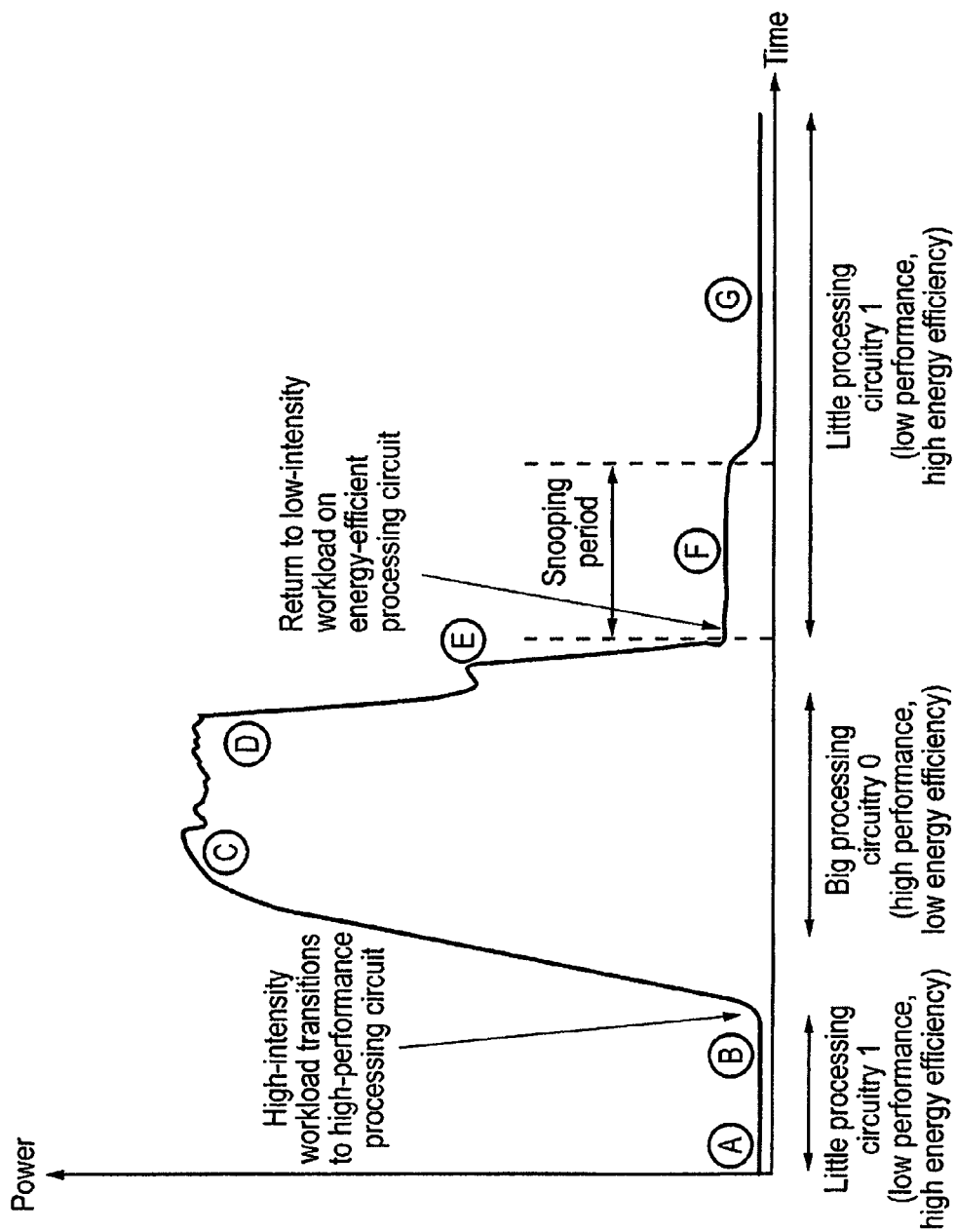
FIG. 9 is a graph showing the variation in power consumed by the data processing system as performance of a processing workload is switched between a low performance, high energy efficiency, processing circuit and a high performance, low energy efficiency, processing circuit.

FIG. 9 shows a graph illustrating the variation in power consumption of the data processing system as performance of the workload 100 is switched between the big processing circuit 10 and the little processing circuit 50.

At point A of FIG. 9, the workload 100 is being performed on the little processing circuitry 50 and so power consumption is low. At point B, a transfer stimulus occurs indicating that high-intensity processing is to be performed and so the performance of the workload is handed over to the big processing circuitry 10. The power consumption then rises and remains high at point C while the big processing circuitry 10 is performing the workload. At point D it is assumed that both big cores are operating in combination to process the workload. If however the performance requirements drop to a level where the workload can be handled by only one of the big cores, then the workload is migrated to only one of the big cores, and the other is powered down, as indicated by the drop in power to the level adjacent point E. However, at point E, another transfer stimulus occurs (indicating that a return to low-intensity processing is desired) to trigger a transfer of the performance of the workload back to the little processing circuitry 50.

When the little processing circuitry 50 starts processing the processing workload, most of the big processing circuitry is in the power saving state, but the cache of the big processing circuitry 10 remains powered during the snooping period (point F in FIG. 9) to enable the data in the cache to be retrieved for the little processing circuitry 50. Hence, the cache of the big processing circuitry 10 causes the power consumption at point F to be higher than at point A when only the little processing circuitry 50 was powered. At the end of the snooping period, the cache of the big processing circuitry 10 is powered down and at point G power consumption returns to the low level when only the little processing circuitry 50 is active.

As mentioned above, in FIG. 9 the power consumption is higher during the snooping period at point F than at point G due to the cache of the big processing circuitry 10 being powered during the snooping period. Although this increase in power consumption is indicated only following the big-to-little transition, following the little-to-big transition there may also be a snooping period, during which the data in the cache of the little processing circuitry 50 can be snooped on behalf of the big processing circuitry 10 by the snoop control unit 75. The snooping period for the little-to-big transition has not been indicated in FIG. 9 because the power consumed by leaving the cache of the little processing circuitry 50 in a powered state during the snooping period is insignificant in comparison with the power consumed by the big processing circuitry 10 when performing the processing workload, and so the very small increase in power consumption due to the cache of the little processing circuitry 50 being powered is not visible in the graph of FIG. 9.

The above described embodiments describe a system containing two or more architecturally compatible processor instances with micro-architectures optimised for energy efficiency or performance. The architectural state required by the operating system and applications can be switched between the processor instances depending on the required performance/energy level, in order to allow the entire workload to be switched between the processor instances. In one embodiment, only one of the processor instances is running the workload at any given time, with the other processing instance being in a power saving condition, or in the process of entering/exiting the power saving condition.

In one embodiment, the processor instances may be arranged to be hardware cache coherent with one another to reduce the amount of time, energy and hardware complexity involved in switching the architectural state from the source processor to the destination processor. This reduces the time to perform the switching operation, which increases the opportunities in which the techniques of embodiments can be used.

Such systems may be used in a variety of situations where energy efficiency is important for either battery life and/or thermal management, and the spread of performance is such that a more energy efficient processor can be used for lower processing workloads while a higher performance processor can be used for higher processing workloads.

Because the two or more processing instances are architecturally compatible, from an application perspective the only difference between the two processors is the performance available. Through techniques of one embodiment, all architectural state required can be moved between the processors without needing to involve the operating system, such that it is then transparent to the operating system and the applications running on the operating system as to which processor that operating system and applications are running on.

When using architecturally compatible processor instances as described in the above embodiments, the total amount of architectural state that needs to be transferred can easily fit within a data cache, and since modern processing systems often implement cache coherence, then by storing the architectural state to be switched inside the data cache, the destination processor can rapidly snoop this state in an energy efficient way making use of existing circuit structures.

In one described embodiment, the switching mechanism is used to ensure thermal limits for the data processing system are not breached. In particular, when the thermal limits are about to be reached, the entire workload can be switched to a more energy efficient processor instance, allowing the overall system to cool while continued program execution takes place, albeit at a lower throughput.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

I claim:

1. A data processing apparatus comprising:
   first processing circuitry and second processing circuitry where both circuitries are configured to perform a processing workload such that the processing workload is performed by one of the first processing circuitry and the second processing circuitry at a time;
   power control circuitry for independently controlling the power supply to the first processing circuitry and the second processing circuitry;
   a workload transfer controller configured to be responsive to a transfer stimulus to initiate a transfer of performance of the processing workload from a source processing circuitry to a destination processing circuitry prior to the source processing circuitry being placed in a power saving condition by the power control circuitry. the source processing circuitry being one of the first and second processing circuitry and the destination processing circuitry being the other of the first and second processing circuitry: wherein:
   at least the source processing circuitry has a cache;
   the power control circuitry is configured, following said transfer, to maintain at least the cache of the source processing circuitry in a powered condition during a snooping period following the start of performance of the transferred processing workload by the destination processing circuitry;
   the data processing apparatus comprises cache snooping circuitry configured during the snooping period to snoop data values in the cache of the source processing circuitry and to retrieve the snooped data values for the destination processing circuitry; and
   the power control circuitry is configured to place said at least the cache of the source processing circuitry in the power saving condition following the end of the snooping period, wherein the power control circuitry is configured to place the source processing circuitry, other than the cache, in the power saving condition during the snooping period. and to place the cache of the source processing circuitry in the power saving condition following the end of the snooping period, wherein the cache of the source processing circuitry is part of a cache hierarchy within the source processing circuitry, and during the snooping period the cache is maintained in the powered state while at least one other cache in the cache hierarchy is in the power saving condition.

2. The data processing apparatus according to claim 1, wherein the processing workload includes at least one processing application and at least one operating system for running the at least one processing application.

3. The data processing apparatus according to claim 2, wherein the workload transfer controller is configured during the transfer to mask predetermined processor specific configuration information from said at least one operating system such that the transfer of the workload is transparent to said at least one operating system.

4. The data processing apparatus according to claim 3, wherein the workload transfer controller comprises at least virtualisation software logically separating the at least one operating system from the first processing circuitry and the second processing circuitry.

5. The data processing apparatus according to claim 1, wherein the first processing circuitry is architecturally compatible with the second processing circuitry such that a processing workload to be performed by the data processing apparatus can be performed on either the first processing circuitry or the second processing circuitry.

6. The data processing apparatus according to claim 5, wherein the first processing circuitry is micro-architecturally different to the second processing circuitry such that performance of the first processing circuitry is different to performance of the second processing circuitry.

7. The data processing apparatus according to claim 1, wherein the destination processing circuitry also comprises a cache.

8. The data processing apparatus according to claim 7, wherein the snooped data values retrieved for the destination processing circuitry by the cache snooping circuitry are stored in the cache of the destination processing circuitry.

9. The data processing apparatus according to claim 7, wherein the destination processing circuitry is configured to invalidate the cache of the destination processing circuitry before the destination processing circuitry starts performing the transferred processing workload.

10. The data processing apparatus according to claim 9, wherein the source processing circuitry is configured to continue performing the processing workload while the cache of the destination processing circuitry is being invalidated, and the workload transfer controller is configured to transfer the performance of the processing workload to the destination processing circuitry after the cache of the destination processing circuitry has been invalidated.

11. The data processing apparatus according to claim 1, wherein the cache of the source processing circuitry is a level two inclusive cache which is configured to store all of the data stored in at least one level one cache of the cache hierarchy.

12. The data processing apparatus according to claim 1, wherein the source processing circuitry is configured to perform a cleaning operation on the cache of the source processing circuitry to write back any dirty data from the cache to a shared memory following the end of the snooping period and before the power control circuitry places the cache of the source processing circuitry in the power saving condition.

13. The data processing apparatus according to claim 1, wherein the destination processing circuitry is in the power saving condition before the occurrence of the transfer stimulus and the power control circuitry is configured to place the destination processing circuitry in the powered condition in response to the transfer stimulus.

14. The data processing apparatus according to claim 1, wherein the snooping period begins when the destination processor starts performing the processing workload.

15. The data processing apparatus according to claim 1, wherein the snooping period ends on the occurrence of any one of a set of snoop stop events comprising at least one snoop stop event.

16. The data processing apparatus according to claim 15, wherein the cache snooping circuitry is configured to monitor whether any of the set of snoop stop events has occurred.

17. The data processing apparatus according to claim 15, wherein the at least one snoop stop event includes an event that occurs when the destination processing circuitry completes a predetermined number of processing transactions of a predetermined type.

18. The data processing apparatus according to claim 15, wherein the at least one snoop stop event includes an event that occurs when a predetermined number of processing cycles have elapsed after the destination processing circuitry starts performing the transferred processing workload.

19. The data processing apparatus according to claim 1, wherein the cache snooping circuitry comprises a coherent interconnect coupled to the first processing circuitry and the second processing circuitry.

20. A data processing apparatus comprising:

first processing circuitry and second processing circuitry where both circuitries are configured to perform a processing workload such that the processing workload is performed by one of the first processing circuitry and the second processing circuitry at a time;

power control circuitry for independently controlling the power supply to the first processing circuitry and the second processing circuitry;

a workload transfer controller configured to be responsive to a transfer stimulus to initiate a transfer of performance of the processing workload from a source processing circuitry to a destination processing circuitry prior to the source processing circuitry being placed in a power saving condition by the power control circuitry, the source processing circuitry being one of the first and second processing circuitry and the destination processing circuitry being the other of the first and second processing circuitry; wherein:

at least the source processing circuitry has a cache;

the power control circuitry is configured, following said transfer, to maintain at least the cache of the source processing circuitry in a powered condition during a snooping period following the start of performance of the transferred processing workload by the destination processing circuitry;

the data processing apparatus comprises cache snooping circuitry configured during the snooping period to snoop data values in the cache of the source processing circuitry and to retrieve the snooped data values for the destination processing circuitry; and the power control circuitry is configured to place said at least the cache of the source processing circuitry in the power saving condition following the end of the snooping period, wherein the snooping period ends on the occurrence of any one of a set of snoop stop events comprising at least one snoop stop event, wherein the at least one snoop stop event includes an event that occurs when the percentage of snoops performed by the cache snooping circuitry that result in a cache hit in the cache of the source processing circuitry drops below a predetermined threshold level.

21. The data processing apparatus according to claim 20, wherein the power control circuitry is configured to maintain the source processing circuitry in the powered condition during the snooping period and to place the source processing circuitry, including the cache, in the power saving condition following the end of the snooping period.

22. The data processing apparatus according to claim 21, wherein the cache of the source processing circuitry is a level one cache.

23. A data processing apparatus comprising:

first processing circuitry and second processing circuitry where both circuitries are configured to perform a processing workload such that the processing workload is performed by one of the first processing circuitry and the second processing circuitry at a time;

power control circuitry for independently controlling the power supply to the first processing circuitry and the second processing circuitry;

a workload transfer controller configured to be responsive to a transfer stimulus to initiate a transfer of performance of the processing workload from a source processing circuitry to a destination processing circuitry prior to the source processing circuitry being placed in a power saving condition by the power control circuitry, the source processing circuitry being one of the first and second processing circuitry and the destination processing circuitry being the other of the first and second processing circuitry; wherein:

at least the source processing circuitry has a cache;

the power control circuitry is configured, following said transfer, to maintain at least the cache of the source processing circuitry in a powered condition during a snooping period following the start of performance of the transferred processing workload by the destination processing circuitry;

the data processing apparatus comprises cache snooping circuitry configured during the snooping period to snoop data values in the cache of the source processing circuitry and to retrieve the snooped data values for the destination processing circuitry;

the power control circuitry is configured to place said at least the cache of the source processing circuitry in the power saving condition following the end of the snooping period, wherein the snooping period ends on the occurrence of any one of a set of snoop stop events comprising at least one snoop stop event; and a shared memory shared between the first and second processing circuitry; wherein the at least one snoop stop event includes an event that occurs when a particular memory region of the shared memory is accessed for the first time by the destination processing circuitry after starting performance of the transferred processing workload.

24. A data processing apparatus comprising:

first processing circuitry and second processing circuitry where both circuitries are configured to perform a processing workload such that the processing workload is performed by one of the first processing circuitry and the second processing circuitry at a time;

power control circuitry for independently controlling the power supply to the first processing circuitry and the second processing circuitry;

a workload transfer controller configured to be responsive to a transfer stimulus to initiate a transfer of performance of the processing workload from a source processing circuitry to a destination processing circuitry prior to the source processing circuitry being placed in a power saving condition by the power control circuitry, the source processing circuitry being one of the first and second processing circuitry and the destination processing circuitry being the other of the first and second processing circuitry; wherein:

at least the source processing circuitry has a cache;

the power control circuitry is configured, following said transfer, to maintain at least the cache of the source processing circuitry in a powered condition during a snooping period following the start of performance of the transferred processing workload by the destination processing circuitry;

the data processing apparatus comprises cache snooping circuitry configured during the snooping period to snoop data values in the cache of the source processing circuitry and to retrieve the snooped data values for the destination processing circuitry, wherein the power control circuitry is configured to place said at least the cache of the source processing circuitry in the power saving condition following the end of the snooping period, wherein the snooping period ends on the occurrence of any one of a set of snoop stop events comprising at least one snoop stop event; and a shared memory shared between the first and second processing circuitry, wherein the at least one snoop stop event includes an event that occurs when a particular memory region of the shared memory, which is accessed by the destination processing circuitry for an initial period after starting performance of the transferred processing workload, is not accessed by the destination processing circuitry for a predetermined period.

25. A data processing apparatus comprising:

first processing circuitry and second processing circuitry where both circuitries are configured to perform a processing workload such that the processing workload is performed by one of the first processing circuitry and the second processing circuitry at a time;

power control circuitry for independently controlling the power supply to the first processing circuitry and the second processing circuitry;

a workload transfer controller configured to be responsive to a transfer stimulus to initiate a transfer of performance of the processing workload from a source processing circuitry to a destination processing circuitry prior to the source processing circuitry being placed in a power saving condition by the power control circuitry, the source processing circuitry being one of the first and second processing circuitry and the destination processing circuitry being the other of the first and second processing circuitry; wherein:

at least the source processing circuitry has a cache;

the power control circuitry is configured, following said transfer, to maintain at least the cache of the source processing circuitry in a powered condition during a snooping period following the start of performance of the transferred processing workload by the destination processing circuitry;

the data processing apparatus comprises cache snooping circuitry configured during the snooping period to snoop data values in the cache of the source processing circuitry and to retrieve the snooped data values for the destination processing circuitry;

the power control circuitry is configured to place said at least the cache of the source processing circuitry in the power saving condition following the end of the snooping period, wherein the snooping period ends on the occurrence of any one of a set of snoop stop events comprising at least one snoop stop event; and a shared memory shared between the first and second processing circuitry, wherein the at least one snoop stop event includes an event that occurs when the destination processing circuitry writes to a predetermined memory location of the shared memory for the first time after starting performance of the transferred processing workload.

26. A data processing apparatus comprising:

first processing circuitry and second processing circuitry where both circuitries are configured to perform a processing workload such that the processing workload is performed by one of the first processing circuitry and the second processing circuitry at a time;

power control circuitry for independently controlling the power supply to the first processing circuitry and the second processing circuitry;

a workload transfer controller configured to be responsive to a transfer stimulus to initiate a transfer of performance of the processing workload from a source processing circuitry to a destination processing circuitry prior to the source processing circuitry being placed in a power saving condition by the power control circuitry, the source processing circuitry being one of the first and second processing circuitry and the destination processing circuitry being the other of the first and second processing circuitry; wherein:

at least the source processing circuitry has a cache;

the power control circuitry is configured. following said transfer, to maintain at least the cache of the source processing circuitry in a powered condition during a snooping period following the start of performance of the transferred processing workload by the destination processing circuitry;

a cache snooping circuitry configured during the snooping period to snoop data values in the cache of the source processing circuitry and to retrieve the snooped data values for the destination processing circuitry, wherein the power control circuitry is configured to place said at least the cache of the source processing circuitry in the power saving condition following the end of the snooping period; and a snoop override controller responsive to a snoop override condition to override snooping of the cache of the source processing circuitry by the cache snooping circuitry and to control the power control circuitry to place the source processing circuitry, including the cache, in the power saving condition after the transfer of the performance of the processing workload without waiting for the end of the snooping period.

27. The data processing apparatus according to claim 26, wherein the snoop override condition occurs when the data in the cache of the source processing circuitry is not required for the destination processing circuitry to perform the transferred processing workload.

28. A data processing apparatus comprising:

first processing means for performing processing and second processing means for performing processing, the first processing means and second processing means are configured to perform a processing workload such that the processing workload is performed by one of the first processing means and the second processing means at a time;

power control means for independently controlling the power supply to the first processing means and the second processing means;

workload transfer control means, responsive to a transfer stimulus, for initiating a transfer of performance of the processing workload from a source processing means to a destination processing means prior to the source processing means being placed in a power saving condition by the power control means, the source processing means being one of the first and second processing means and the destination processing means being the other of the first and second processing means; wherein:

at least the source processing means has a cache means for storing cached data values;

the power control means is configured, following said transfer, to maintain at least the cache means of the source processing means in a powered condition during a snooping period following the start of performance of the transferred processing workload by the destination processing means;

cache snooping means for snooping data values in the cache means of the source processing means during the snooping period, and retrieving the snooped data values for the destination processing means;

the power control means is configured to place said at least the cache means of the source processing means in the power saving condition following the end of the snooping period; and a snoop override controller means, responsive to a snoop override condition, for overriding snooping of the cache means of the source processing means by the cache snooping means and for controlling the power control means to place the source processing means, including the cache means, in the power saving condition after the transfer of the performance of the processing workload without waiting for the end of the snooping period.

29. A data processing method for an apparatus comprising first processing circuitry and second processing circuitry configured to perform a processing workload such that the processing workload is performed by one of the first processing circuitry and the second processing circuitry at a time; the method comprising the steps of:

performing the processing workload with a source processing circuitry, the source processing circuitry being one of the first and second processing circuitry and comprising a cache, the other of the first and second processing circuitry being a destination processing circuitry;

in response to a transfer stimulus, transferring performance of the processing workload from the source processing circuitry to the destination processing circuitry prior to the source processing circuitry being placed in a power saving condition;

following said transferring step, maintaining at least the cache of the source processing circuitry in a powered condition during a snooping period following the start of performance of the transferred processing workload by the destination processing circuitry;

during the snooping period, snooping data values in the cache of the source processing circuitry and retrieving the snooped data values for the destination processing circuitry;

placing said at least the cache of the source processing circuitry in the power saving condition following the end of the snooping period, and overriding, in response to a snoop override condition, snooping of the cache of the source processing circuitry and placing the source processing circuitry, including the cache, in the power saving condition after the transfer of the performance of the processing workload without waiting for the end of the snooping period.

* * * * *